United States Patent
Sahin et al.

(10) Patent No.: US 10,546,116 B2
(45) Date of Patent: Jan. 28, 2020

(54) SYSTEMS AND METHODS EVALUATING PASSWORD COMPLEXITY AND STRENGTH

(71) Applicant: Massachusetts Institute of Technology, Cambridge, MA (US)

(72) Inventors: Cem S Sahin, Concord, MA (US); Robert D. Lychev, Cambridge, MA (US); Neal Wagner, Burlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 146 days.

(21) Appl. No.: 15/381,493

(22) Filed: Dec. 16, 2016

(65) Prior Publication Data

US 2018/0012014 A1    Jan. 11, 2018

Related U.S. Application Data

(60) Provisional application No. 62/268,712, filed on Dec. 17, 2015.

(51) Int. Cl.
*G06F 21/46* (2013.01)
*G06F 21/31* (2013.01)
(Continued)

(52) U.S. Cl.
CPC ............ *G06F 21/46* (2013.01); *G06F 21/31* (2013.01); *G06F 21/55* (2013.01); *G06F 21/577* (2013.01);
(Continued)

(58) Field of Classification Search
CPC .. G06F 21/46; G06F 21/31; G06F 2221/2103; G06F 21/577; G06F 21/64;
(Continued)

(56) References Cited

U.S. PATENT DOCUMENTS 6,240,184 B1 * 5/2001 Huynh ............... G06F 21/31
380/206
7,574,202 B1 * 8/2009 Tsao ............... H04L 63/0272
370/310

(Continued)

OTHER PUBLICATIONS

Bonneau, J., "The science of guessing: Analyzing an anonymized corpus of 70 million passwords," in Proceedings of the IEEE Symposium on Security and Privacy, May 2012, pp. 538-552.

(Continued)

*Primary Examiner* — Theodore C Parsons
*Assistant Examiner* — Howard H. Louie
(74) *Attorney, Agent, or Firm* — McCarter & English, LLP

(57) ABSTRACT

A password evaluation engine used to evaluate a user's password that redefines the concepts of password complexity and password strength is discussed. Password complexity may be calculated by the evaluation engine so as to take into account the amount of knowledge possessed by a potential attacker, seeking to crack the password, of the rules corresponding to a rule set used for generating the password. A determination of password strength by the evaluation engine may consider a potential attacker's computational resources, the protection function used to protect/store a password and the amount of time available to the attacker to crack the password with respect to an identified search space based on the attacker's knowledge. Embodiments also enable a password strength estimator to be evaluated and policy recommendations to be generated for an entity's password policy requirements.

27 Claims, 11 Drawing Sheets

(51) Int. Cl.
   *G06F 21/55* (2013.01)
   *G06F 21/57* (2013.01)
   *H04L 9/08* (2006.01)

(52) U.S. Cl.
   CPC ........ *H04L 9/0863* (2013.01); *G06F 2221/00* (2013.01)

(58) Field of Classification Search
   CPC ...... G06F 21/60; G06F 21/55; G06F 2221/00; G06F 21/604; G06F 21/57; H04L 63/1433; H04L 63/0846; H04L 63/0838; H04L 63/08; H04L 9/32; H04L 63/083; H04L 9/3226; H04L 63/10; H04L 9/0863
   See application file for complete search history.

(56) References Cited

U.S. PATENT DOCUMENTS

| | | | | |
|---|---|---|---|---|
| 8,332,918 | B2* | 12/2012 | Vedula | G06F 21/46 713/182 |
| 8,555,357 | B1* | 10/2013 | Gauvin | G06F 21/577 380/286 |
| 9,003,195 | B1* | 4/2015 | Leininger | G06F 21/46 713/168 |
| 2005/0262338 | A1* | 11/2005 | Irwin, Jr. | G07F 17/329 713/155 |
| 2008/0082828 | A1* | 4/2008 | Jennings | G06F 21/72 713/176 |
| 2009/0064289 | A1* | 3/2009 | Jang | G06F 21/33 726/4 |
| 2010/0316006 | A1* | 12/2010 | Thomson | H04W 4/02 370/329 |
| 2011/0239267 | A1 | 9/2011 | Lyne et al. | |
| 2013/0081120 | A1* | 3/2013 | DeLuca | H04W 4/04 726/7 |
| 2013/0254875 | A1* | 9/2013 | Sama | G06F 21/31 726/19 |
| 2013/0269010 | A1* | 10/2013 | Wheeler | G06F 21/46 726/6 |
| 2014/0173439 | A1* | 6/2014 | Gutierrez | G08B 21/24 715/727 |
| 2014/0181956 | A1* | 6/2014 | Ahn | G06F 21/46 726/18 |
| 2014/0223575 | A1* | 8/2014 | Nandi | G06Q 30/0282 726/27 |
| 2014/0282955 | A1* | 9/2014 | Fontenet | H04L 63/083 726/7 |
| 2014/0323141 | A1* | 10/2014 | Boos | H04B 7/02 455/452.1 |
| 2014/0337850 | A1* | 11/2014 | Iniguez | G06F 9/4843 718/102 |
| 2014/0373088 | A1* | 12/2014 | Aggarwal | G06F 21/46 726/1 |
| 2014/0380453 | A1* | 12/2014 | Alonso Cebrian | H04L 63/0838 726/9 |
| 2014/0380478 | A1 | 12/2014 | Canning et al. | |
| 2015/0024710 | A1* | 1/2015 | Becker | H04W 12/06 455/411 |
| 2015/0067760 | A1 | 3/2015 | Waltermann et al. | |
| 2015/0074579 | A1* | 3/2015 | Gladstone | H04L 63/1433 715/771 |
| 2015/0156578 | A1* | 6/2015 | Alexandridis | H04R 3/005 381/92 |
| 2015/0161610 | A1* | 6/2015 | Sahadevan | G06Q 20/4016 705/44 |
| 2015/0319185 | A1* | 11/2015 | Kirti | H04L 63/1416 726/23 |
| 2016/0014157 | A1* | 1/2016 | Gomez | H04L 63/20 726/1 |
| 2016/0357660 | A1* | 12/2016 | Dean | G06F 11/3692 |

OTHER PUBLICATIONS

Castelluccia, C., C. Abdelberi, M. Durmuth, and D. Perito, "When privacy meets security: Leveraging personal information for password cracking," CoRR, arXiv:1304.6584, Apr. 2013.

Castelluccia, C., M. Durmuth, and D. Perito, "Adaptive password-strength meters from Markov models." in Proceedings of the Network and Distributed System Security Symposium (NDSS), Feb. 2012.

de Came de Carnavalet, X. and M. Mannan, "From very weak to very strong: Analyzing password-strength meters," in Network and Distributed System Security (NDSS) Symposium 2014. Internet Society, Feb. 2014.

Dell'Amico, M., P. Michiardi, and Y. Roudier, "Password strength: An empirical analysis," in INFOCOM, 2010 Proceedings IEEE, Mar. 2010, pp. 1-9.

Florencio, D. and C. Herley, "A large-scale study of web password habits," in Proceedings of the 16th International Conference on World Wide Web, ser. WWW '07. New York, NY, USA: ACM, May 2007, pp. 657-666.

Hirschhorn, M., "The am-gm inequality," The Mathematical Intelligencer, vol. 29, No. 4, pp. 7-7, Sep. 2007.

Inglesant, P. G. and M. A. Sasse, "The true cost of unusable password policies: Password use in the wild," in Proceedings of the SIGCHI Conference on Human Factors in Computing Systems, ser. CHI '10. New York, NY, USA: ACM, Apr. 2010, pp. 383-392.

Kelley, P., S. Komanduri, M. Mazurek, R. Shay, T. Vidas, L. Bauer, N. Christin, L. Cranor, and J. Lopez, "Guess again (and again and again): Measuring password strength by simulating passwordcracking algorithms," in 2012 IEEE Symposium on Security and Privacy (SP), May 2012, pp. 523-537.

Klein, D.V., "Foiling the cracker: A survey of, and improvements to, password security," in Proceedings of the 2nd USENIX Security Workshop, Aug. 1990, pp. 5-14.

Komanduri, S., R. Shay, P. G. Kelley, M. L. Mazurek, L. Bauer, N. Christin, L. F. Cranor, and S. Egelman, "Of passwords and people: Measuring the effect of password-composition policies," in Proceedings of the SIGCHI Conference on Human Factors in Computing Systems, ser. CHI '11. New York, NY, USA: ACM, May 2011, pp. 2595-2604.

Li, Z. W. Han, and W. Xu, "A large-scale empirical analysis of chinese web passwords," in Proc. 23rd USENIX Security Symposium, USENIX Security (Aug. 2014), 2014.

Ma, J., W. Yang, M. Luo, and N. Li, "A study of probabilistic password models," in Proceedings of the IEEE Symposium on Security and Privacy, May 2014, pp. 689-704.

Mazurek, M. L., S. Komanduri, T. Vidas, L. Bauer, N. Christin, L. F. Cranor, P. G. Kelley, R. Shay, and B. Ur, "Measuring password guessability for an entire university," in Proceedings of the 2013 ACM SIGSAC Conference on Computer & Communications Security, ser. CCS '13. New York, NY, USA: ACM, Nov. 2013, pp. 173-186.

Narayanan, A. and V. Shmatikov, "Fast dictionary attacks on passwords using time-space tradeoff," in Proceedings of the 12th ACM Conference on Computer and Communications Security, ser. CCS '05. New York, NY, USA: ACM, Nov. 2005, pp. 364-372.

Rankin, K., "Hack and /: Password cracking with gpus, part ii: Get cracking," Linux J., vol. 2012, No. 214, Feb. 2012.

Shannon, C.E., "A mathematical theory of communication," SIGMOBILE Mob. Comput. Commun. Rev., vol. 5, No. 1, pp. 3-55, Jan. 2001.

Shay, R., P. G. Kelley, S. Komanduri, M. L. Mazurek, B. Ur, T. Vidas, L. Bauer, N. Christin, and L. F. Cranor, "Correct horse battery staple: Exploring the usability of system-assigned passphrases," in Proceedings of the Eighth Symposium on Usable Privacy and Security, ser. SOUPS '12. New York, NY, USA: ACM, Jul. 2012, pp. 1-20.

Shay, R., S. Komanduri, A. L. Durity, P. S. Huh, M. L. Mazurek, S. M. Segreti, B. Ur, L. Bauer, N. Christin, and L. F. Cranor, "Can long passwords be secure and usable?" in Proceedings of the 32nd

(56) References Cited

OTHER PUBLICATIONS

Annual ACM Conference on Human Factors in Computing Systems, ser. CHI '14. New York, NY, USA: ACM, Apr. 2014, pp. 2927-2936.

Shay, R., S. Komanduri, P. G. Kelley, P. G. Leon, M. L. Mazurek, L. Bauer, N. Christin, and L. F. Cranor, "Encountering stronger password requirements: User attitudes and behaviors," in Proceedings of the Sixth Symposium on Usable Privacy and Security, ser. SOUPS '10. New York, NY, USA: ACM, Jul. 2010, pp. 2:1-2:20.

Ur, B., P. G. Kelley, S. Komanduri, J. Lee, M. Maass, M. L. Mazurek, T. Passaro, R. Shay, T. Vidas, L. Bauer et al., "How does your password measure up? the effect of strength meters on password creation." in USENIX Security Symposium, Aug. 2012, pp. 65-80.

Ur, B., S. M. Segreti, L. Bauer, N. Christin, L. F. Cranor, S. Komanduri, D. Kurilova, M. L. Mazurek, W. Melicher, and R. Shay, "Measuring real-world accuracies and biases in modeling password guessability," in 24th USENIX Security Symposium (USENIX Security 15). Washington, D.C.: USENIX Association, Aug. 2015, pp. 463-481.

Veras, R., C. Collins, and J. Thorpe, "On the semantic patterns of passwords and their security impact," in Proceedings of the Network and Distributed System Security Symposium (NDSS'14), Feb. 2014.

Verizon RISK Team, "Verizon 2012 data breach investigations report," Technical report, 2012. Accessed on the Internet on May 15, 2017 at http://www.verizonbusiness.com/resources/reports/rp_data-breach-investigations-report-2012_en_xg.pdf.

Weir, M., S. Aggarwal, B. de Medeiros, and B. Glodek, "Password cracking using probabilistic context-free grammars," in Proceedings of the IEEE Symposium on Security and Privacy, May 2009, pp. 391-405.

Weir, M., S. Aggarwal, M. Collins, and H. Stern, "Testing metrics for password creation policies by attacking large sets of revealed passwords," in Proceedings of the 17th ACM Conference on Computer and Communications Security, ser. CCS '10. New York, NY, USA: ACM, Oct. 2010, pp. 162-175.

Yang, S., S. Ji, X. Hu, and R. Beyah, "Effectiveness and soundness of commercial password strength meters," NDSS Symposium 2015, Jul. 2015. Retrieved from the Internet on May 15, 2017 at https://www.internetsociety.org/sites/default/files/336.pdf.

International Search Report and Written Opinion for PCT/US2016/067214 dated May 5, 2017, p. 1-13.

* cited by examiner

SYSTEMS AND METHODS EVALUATING PASSWORD COMPLEXITY AND STRENGTH

RELATED APPLICATIONS

This application claims the benefit of, and priority to, U.S. Provisional Patent Application No. 62/268,712, entitled "General Framework for Evaluating Password Complexity and Strength, filed Dec. 17, 2015, the contents of which are incorporated herein by reference in their entirety.

STATEMENT OF GOVERNMENT INTEREST

This invention was made with Government support under Contract No. FA8721-05-C-0002 awarded by the U.S. Air Force. The Government has certain rights in the invention.

BACKGROUND

Password-based authentication remains arguably the most widely used method of user authentication in computing environments today. To encourage users to select good passwords, enterprises often enforce policies, for example, by requiring passwords to meet a minimum length or contain special characters. Password estimators have been developed to attempt to estimate the strength of a password in the face of attackers in the wild.

BRIEF SUMMARY

Embodiments of the present invention provide a password evaluation engine for evaluating a user's password by redefining the concepts of password complexity and password strength. Password complexity is calculated by the evaluation engine so as to take into account the amount of knowledge possessed by a potential attacker, seeking to crack the password, of the rules corresponding to a rule set used for generating the password. This use of a modified understanding of password complexity by the evaluation engine yields a more accurate picture of a search space that would need to be searched by the attacker. A determination of password strength by the evaluation engine considers a potential attacker's computational resources, the protection function used to protect/store a password and the amount of time available to the attacker to crack the password with respect to the identified search space which is based on attacker's knowledge. Embodiments also enable a password strength estimator to be evaluated and policy recommendations to be generated for an entity's password policy requirements.

A computing device-implemented method for evaluating a password includes identifying a rule set used to create a password for a user. The password consists of characters from an alphabet while the rule set is based on one or more rules applicable to creating the password. The method also identifies a size of a minimum search space equal to the smallest subset of passwords that can be created from the alphabet based on the rule set and calculates a complexity of the password by determining a size of an adjusted minimum search space based at least in part on an assigned amount of knowledge of the rules possessed by a potential attacker attempting to crack the password. The method further determines a strength of the password based on at least an attacker's resources, a protection function used to store the password and a time available to crack the password with respect to the adjusted minimum search space. The method additionally generates an evaluation of the password based on the calculated complexity and determined strength.

In another embodiment, a computing device-implemented method for evaluating a password policy includes identifying an existing rule set used to create passwords for an entity. The passwords consist of a plurality of characters from an alphabet while the rule set includes a plurality of rules applicable to creating the passwords. The method also includes identifying a size of a minimum search space equal to the smallest subset of passwords that can be created from the alphabet based on the rule set and calculating a complexity of a password by determining a size of an adjusted minimum search space based at least in part on an assigned amount of knowledge of the rules possessed by a potential attacker attempting to crack the passwords. The method further includes determining a first strength of the password. The determining of the first strength is based on at least an attacker's resources, a protection function used to store the password and a time available to crack the password with respect to the adjusted minimum search space. The method also includes generating a recommendation for the password policy based on the determined first strength.

In an embodiment, a system for evaluating a password includes a computing device equipped with a processor and a network interface that is configured to execute an evaluation engine. The evaluation engine when executed identifies a rule set used to create a password for a user. The password consists of characters from an alphabet while the rule set is based on one or more rules applicable to creating the password. The evaluation engine when executed also identifies a size of a minimum search space equal to the smallest subset of passwords that can be created from the alphabet based on the rule set and calculates a complexity of the password by determining a size of an adjusted minimum search space based at least in part on an assigned amount of knowledge of the rules possessed by a potential attacker attempting to crack the password. The evaluation engine when executed also determines a strength of the password based on at least an attacker's resources, a protection function used to store the password and a time available to crack the password with respect to the adjusted minimum search space. The evaluation engine when executed additionally generates an evaluation of the password based on the calculated complexity and determined strength. The system further includes a display device communicatively coupled to the computing device that is configured to display a user interface generated by the evaluation engine.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
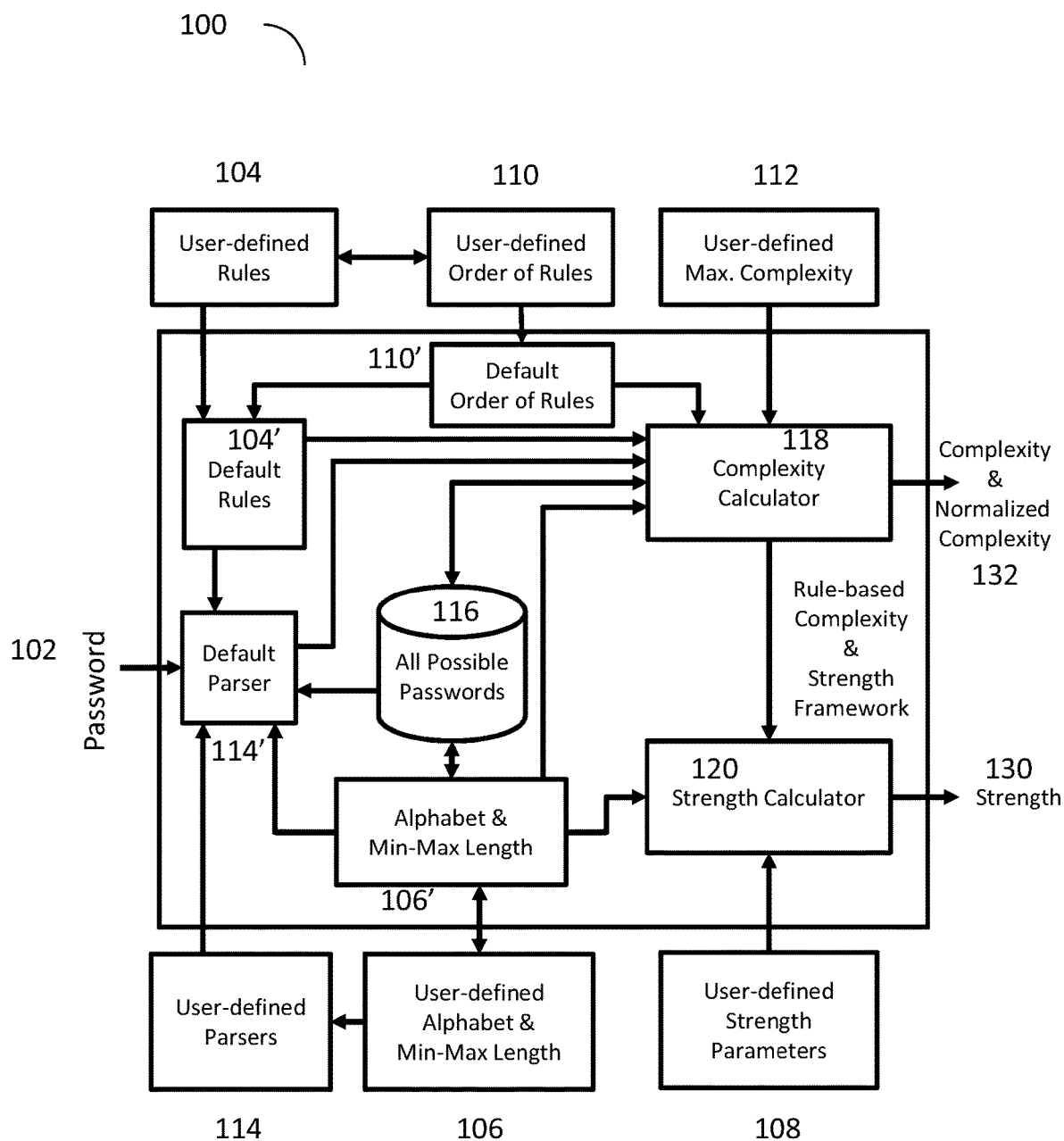
FIG. 1 depicts an exemplary evaluation engine in an exemplary embodiment.

Systems and methods according to exemplary embodiments provide an accurate assessment of a password's resistance to cracking attacks and the effectiveness of password policies chosen by an entity. A good password should have two key properties. The password should be difficult to guess by an adversary while also being easy to remember. When selecting their password users almost always opt for the latter rather than the former. Although the best way to determine how difficult it may be to crack a user-selected password is to actually check its resistance to types of cracking attacks employed by attackers in the wild, implementing such a strategy at an enterprise is infeasible in practice due to both an inability to duplicate attacker resources and a lack of time.

Embodiments described herein provide a computing device-implemented password evaluation engine (also hereafter "evaluation engine") that redefines the concepts of password complexity and strength and utilizes both an improved complexity calculation and strength determination in evaluating passwords and/or the password policies by which the passwords are generated. As used herein, the concepts of password complexity and strength capture both human biases and many known techniques attackers use to recover stolen credentials in real life, such as brute-force attacks, mangled wordlist attacks and attacks that make use of Probabilistic Context Free Grammars, Markov Models, and Natural Language Processing. In particular, the evaluation engine recognizes that an attacker's likely success at cracking a password should be determined by considering the attacker's available computational resources, time and the function used to store that password, the topology that bounds that attacker's search space (which is based on that attacker's available inputs including prior knowledge), transformations the attacker can use to tweak and explore its inputs, and the path of exploration (i.e. order of attack/search space exploration) likely to be chosen by the attacker (which can be based on the attacker's perceived probability of success for each type of attack).

As noted above, passwords remain a popular authentication technique even though it is common for users to select bad passwords that can be easily cracked by attackers. Researchers and practitioners agree that having good passwords is critical in many applications, but unfortunately users often choose bad passwords. As a result, many network intrusions exploit weak or stolen credentials (i.e., username and/or password). To encourage users to select good passwords, enterprises often enforce password generation policies setting forth defined criteria. For example, some password policies may require passwords to meet a minimum length or contain special characters. Such policies have been proven to be ineffectual in practice and stolen user credentials are often cracked by attackers before victims get a chance to react properly.

Password strength estimators have been developed to attempt to estimate the strength of a password in the face of attackers in the wild. To truly evaluate the quality of a password-strength estimator, one must compare its estimates with respect to real password-cracking attacks. However, this is frequently infeasible in practice due to lack of proper equipment and time as well as prohibitive company policies. Although, for the purposes of empirical evaluation, well-known password-cracking tools such as John the Ripper (JtR) and Hashcat can in principle be run on commodity hardware, their performance will not do justice to attackers' capabilities in the wild. Even when appropriate password-cracking hardware is available, there may not be enough time. For example, it is impractical to wait for a year to see if a password may really require that long to be recovered. In that time, attackers' capabilities are likely to improve, and the password-strength estimator under test is likely to undergo significant updates. Therefore, a need arises for better password strength estimators.

The term, "password complexity" has typically referred to the usage of simple characteristics such as allowed characters, length, and symmetry of a password. However, an attacker's success is limited by available computational resources, time, prior knowledge, and the way in which the password is stored. Because password complexity traditionally did not take such details into account, it did not provide an accurate estimate of how long it may take an attacker to crack a password. As described further herein, embodiments employ an evaluation engine to supplement the typical understanding of password complexity to also include an amount of an attacker's knowledge of the rule set used to create the password so as to generate a more accurate understanding of the actual search space for an attacker. Rule sets are also described further herein.

As used herein, "password strength" includes extrinsic factors including, but not limited to, an attacker's capabilities (e.g., computational resources including access to parallel computing resources), time available to the attacker to crack the password, and the way in which the password is protected on the platform on which it is stored (e.g., encryption technique and/or strength of platform security), considered in combination with the redefined search space identified based on the expanded understanding of password complexity. In practice, password strength can be difficult to estimate because of continuous but as-yet-unknown advances in technology and any additional auxiliary information available to the adversary over time. Nonetheless, password strength as described herein can provide a more complete sense of security due to its extensive consideration of how attackers crack passwords in the wild.

As used herein, an "adversary" or "attacker" is defined to include a non-deterministic algorithm.

Both password complexity and strength require understanding of an attacker's use of prior knowledge which may be expressed in the form of a topology that bounds the attacker's search space. A topology is defined by the attacker's knowledge about the alphabet used to create the password, rules that it can use to tweak and explore words created by that alphabet, and the exploration path of the resultant search space. The exploration path can be based on the attacker's perceived probability of success when using a particular tool.

The determination of the topology that bounds the attacker's search space by embodiments is now described in greater detail. A finite alphabet $\alpha$ can be defined as a finite set of characters, and a password p can be defined as a finite string over $\alpha$. The profinite set $\mathbb{X}(\alpha)$ of all finite strings over $\alpha$ is the set of all possible passwords over $\alpha$. Note that $\mathbb{X}(\{0,1\})=\{0,1\}^*$.

In one embodiment, a rule is a function that can be applied to the profinite set of all possible passwords to identify a subset of the passwords that obey the rule. Non-limiting examples of rules may include mandatory minimum password lengths or mandatory special character inclusion. Other examples of rules may include outputs from a model trained using large sets of passwords from major password breaches. A rule, denoted by $\xi$, is a function $\xi: \mathbb{X}(\alpha) \times \{0,1\}^* \rightarrow 2^{\mathbb{X}(\alpha)}$ that takes as input a finite alphabet $\alpha$ together with a finite bit string aux and outputs a subset of $\mathbb{X}(\alpha)$. Here, aux is auxiliary information that can be used to describe password-policy requirements, e.g., password minimum and maximum length or mandatory usage of capital letters and numbers. The collection of all subspaces chosen out of the profinite set by application of a series of rules can make up the search space of a potential attacker.

In an embodiment, aux may be viewed as a logical formula specifying the requirements that users have to satisfy when selecting a password. It follows that when at least two rules, $\xi_i, \xi_j, \ldots$, are combined to produce a new rule, $\xi_k$, $aux_k$ must be interpreted as $aux_k = aux_i \wedge aux_j \wedge \ldots$ (i.e., the resulting $aux_k$ should satisfy the requirements corresponding to $aux_i$ and $aux_j$ and all other aux's in this combination.) In various embodiments, that characters of aux may come from $\alpha$ but do not have to come from $\alpha$.

An example of uses of rules are to generate all possible passwords or all possible English dictionary words with a certain maximal length as defined in aux. For example, an alphanumeric alphabet, $\alpha=\{A-Z, a-z, 0-9\}$ may be defined, where a password, p, is a finite string over $\alpha$. Three rules, $\xi_1(\alpha, aux_1)$, $\xi_2(\alpha, aux_2)$, and $\xi_3(\alpha, aux_3)$ may also be defined where $aux_1$ is a bit string that specifies passwords consisting of English dictionary words with maximum length of 8 characters, $aux_2$ is a bit string that specifies passwords consisting of numeric characters with a maximum length of 4, and $aux_3$ specifies any alphanumeric string of length l, where $1 \le l \le 8$.

In one embodiment, a rule set with respect to a rule $\xi$, denoted by $\{x_1, x_2, \ldots\}$, is the combination of infinitely countable passwords defined by a rule, $\xi: \mathbb{X}(\alpha) \times \{0,1\}^* \rightarrow 2^{\mathbb{X}(\alpha)}$. The combination of any finite set of rules $\Xi=\{\xi_1, \ldots, \xi_k\}$ over some finite alphabets $\alpha_1, \ldots, \alpha_k \subseteq \alpha$ is the union of the outputs of those rules $\cup_{i=1}^{k}(\xi_i(\alpha_i, aux_i)) \subseteq \mathbb{X}(\alpha)$ for any auxiliary inputs $aux_1, \ldots, aux_k$. In various embodiments, the union of rules may comprise a single rule or multiple rules.

In an embodiment, each of the rules can be applied to the alphabet to provide a corresponding rule set. As an example, rule set $\xi_1=\{p_1, p_2, \ldots\}$, $\forall i \in Z^+$ may be a subset of $\mathbb{X}(\alpha)$ that includes 1-to-8 character dictionary words, e.g., hello, Goodbye, etc. Rule set $\xi_2=\{p_1', p_2', \ldots\}$, $\forall i \in Z^+$ may be a subset of $\mathbb{X}(\alpha)$ that includes 1-to-4 character strings of digits, e.g., 0011, 555, etc. Rule set $\xi_3=\{p_1'', p_2'', \ldots\}$, $\forall i \in Z^+$ may be a subset of $\mathbb{X}(\alpha)$ that includes 1-to-8 character strings of letters or digits, e.g., a1b2c3, zzz3, etc. Because an adversary can be represented herein as a non-deterministic password guessing algorithm, an adversary that knows the above rules has a significantly reduced search space to inspect and might include a guessing algorithm that tries dictionary words up to 8 characters in length at random and, upon exhausting all such words, tries random numbers between 1 and 1000.

A combination of the above three rules $\Xi_1=\{\xi_1, \xi_2, \xi_3\}$ is the union of rule outputs, $\cup_{i=1}^{3}(\xi_i(\alpha_i, aux_i)) \subseteq \mathbb{X}(\alpha)$ and includes passwords from all three rule sets above. A permutation of $\Xi_1=\{\xi_1, \xi_2, \xi_3\}$ gives a directed graph, $G_1$ in which the edges impose an ordering of the rules, e.g., $(\xi_2, \xi_1, \xi_3)$. The password, p=password, is generatable by rule combination, $\Xi_1$, because $p \in \cup_{i=1}^{3}[\xi_i(\alpha_i, aux_i)]$. Note that password, p'=password1, is not generatable by $\Xi_1$ as it is not an element of the union of rule sets $\xi_1, \xi_2, \xi_3$.

In an embodiment, a permutation of any finite set of rules $\Xi=\{\xi_1, \ldots, \xi_k\}$ over some finite alphabets $\alpha_1, \ldots, \alpha_k \subseteq \alpha$ outputs a directed graph $G=(V \subseteq \Xi, E \subseteq \Xi \times \Xi)$ in which the edges impose a total ordering on the vertices for any auxiliary inputs $aux_1, \ldots, aux_k$. By examining a permutation of the rules, the evaluation engine may capture a situation where an attacker or adversary deems certain rules to be more important or likely to result in success than others and, therefore, may choose to search the rule set produced by such a rule before less likely rule sets. In this application, the concept of topology is interchangeable with this permutation of rules. A finite string $\sigma \in \mathbb{X}(\alpha)$ is generatable by a union of rules $\Xi=\{\xi_1, \ldots, \xi_k\}$, if there exist alphabets $\alpha_1, \ldots, \alpha_k \subseteq \alpha$ and auxiliary inputs $aux_1, \ldots, aux_k$ such that $\sigma \in \cup_{i=1}^{k}[\xi_i(\alpha_i, aux_i)]$.

In one embodiment, to test a password for password strength or password complexity, the evaluation engine breaks up or parses a password into component subsets ("parsings") that can be tested for membership in different rule sets. In some embodiments, a parsing of a finite string $\sigma \in \mathbb{X}(\alpha)$ is a partition of its constituent characters in $\alpha$. The set of all parsings of a password p is referred to herein as [P]. The evaluation engine described herein can employ a parsing function that accepts a password under testing as an input and output a list of parsings. For example, a parsing function $\Gamma: \Xi \times p \rightarrow [p] \subseteq [P]$ can conform a union of rules $\Xi=\{\xi_1, \ldots, \xi_k\}$ on a password p and return a list of parsings of p. In some embodiments, $\Gamma$ can generate all possible parsings of p if there is no predefined rule.

As an example, one parsing of p''=psword1 is p|s|word1. A parsing function, $\Gamma(\Xi_1, p'')$, can conform the rule combination, e.g., $\Xi_1$ on p'' to produce a list of parsings [p'']. Example parsings from [p''] include ps|word|1, ps|wo|rd1, etc.

In one embodiment, the password complexity of a password p, over an alphabet $\alpha$, can be defined with respect to a finite set of rules $\Xi=\{\xi_1, \xi_2, \ldots, \xi_k\}$ as the size of the smallest subset of $\mathbb{X}(\alpha)$ containing p that can be generated with any combination of rules in $\Xi$ over $\alpha$ with any auxiliary inputs. If no combination of rules in $\Xi$ can generate a set that contains p, then p's password complexity is the cardinality of $\mathbb{X}(\alpha)$.

As described above, embodiments use the concept of password complexity to address the question of how hard it may be for an attacker to guess a password using the attacker's own set of rules and dictionaries knowing at least some of the password policy requirements used to generate that password. Previous entropy-based password complexity measures were not adequate because they did not provide the means for specifying the appropriate password search space based on precisely this kind of information, i.e., rules and dictionaries that attackers may be using. Further, in some embodiments, password complexity can also capture a situation where an attacker has no information about password policies and cannot generate the password with any of its rules and dictionaries. It will be appreciated that in such a case the password may be as good as a random finite string since the attacker is not able to limit the search space.

It should be appreciated that in most server systems, a password is not maintained on the server in plaintext because it would be entirely unprotected in the event of an unauthorized breach of the server. Accordingly, a server or computing system may transform or encrypt the password or store the password behind an extra layer of authentication such as a protection function. A protection function can be used to transform, encrypt, or store a password, for example, as a string such that the original password may be more difficult for an attacker to recover. As an example, protection function $F_\alpha$ is a function $F_\alpha: \mathbb{X}(\alpha) \rightarrow \{0,1\}^*$ that takes a finite string over $\alpha$ and outputs a bit string. In some embodiments, a protection function $F_\alpha$ can be any one-way function that takes as input a string (e.g., a password) and outputs a bit string from which it is difficult to recover the original input string. Example protection functions may include common hash functions such as MD5 or SHA-1.

As previously noted, embodiments may also determine password strength. A determination of password strength can simulate how long it takes an attacker to recover the correct password and/or whether the attacker is able to recover the correct password within a specified time limit. For example, a password strength determination may be made with respect to an adversary A. In accordance with various embodiments, the inputs to the password strength determination can include an alphabet $\alpha$, a protection function F associated with $\alpha$, the description of adversary A, a password p over $\alpha$, and a time period T. In some embodiments, the description of the adversary A can include its available computational resources, its rules, and any available auxiliary information. A can take as input $\alpha$, F, p, T, and any additional necessary input including random inputs. The password strength determination can end either after A outputs a finite string p' or when the time after the experiment starts exceeds T, whichever comes first. In an exemplary embodiment, a password strength simulation taking ($\alpha$, F, A, T, p) as inputs can return one if, within time T after its start, A outputs a finite string p' such that F(p')=F(p) and can return zero otherwise. If the function included within the password strength determination returns zero, the password can be considered secure.

In one embodiment, the password strength determination can assign to the adversary any available auxiliary information. As such, the password strength determination can capture an attacker's potential knowledge of the policies under which the input password was selected while also addressing situations in which an attacker could steal a multitude of additional protected passwords.

In one embodiment, an evaluation engine may include a password-strength estimator that can determine a password strength for an individual password. As described above, the password strength determination can return a value of one if the password can be broken or zero if the password is not broken within a time T. As the time T grows longer, it may be more likely that the password strength estimator can give results that differ from the real-world expectation based upon the changing capabilities of attackers in the wild. To address this timing issue, some embodiments focus on identifying passwords that cannot be broken within a smaller, more practical amount of time T (e.g., 4 weeks). In some embodiments, two criteria can be used to evaluate password strength estimators: reliability and inclusion. Reliability indicates that the estimator does not create a false sense security in the sense that it marks weak passwords as strong. Inclusion denotes that the estimator does not reduce the space of passwords considered to be strong by marking strong passwords as weak.

A password strength estimator ideally should not overestimate or underestimate password strength. In one embodiment, a password strength estimator may be a password FAT-strength estimator E that is a function that accepts an alphabet $\alpha$, a protection function F associated with $\alpha$, the description of adversary A, a password p over $\alpha$, a time period T, and any additional information AUX, as inputs. The password FAT-strength estimator can output 1, in which case E may mark p as FAT-secure, or 0, in which case E may mark p as not FAT-secure.

In one embodiment a password FAT-strength estimator E over an alphabet $\alpha$ is reliable over a test set $P \subseteq \mathbb{X}(\alpha)$ if the fraction of P that E marks as FAT-secure that is not FAT-secure is negligible in |P|. The password FAT-strength estimator E over an alphabet $\alpha$ is inclusive over a test set $P \subseteq \mathbb{X}(\alpha)$ if the fraction of P that E marks as not FAT-secure that is FAT-secure is negligible in |P|. The password FAT-strength estimator E over an alphabet $\alpha$ is accurate over a test set $P \subseteq \mathbb{X}(\alpha)$ if it is both reliable and inclusive with respect to P.

As mentioned above, attackers use known types of tools when attempting to crack a password. For an exemplary rule including probabilistic context-free grammar, an attacker may use a large set of passwords from major password breaches to train its password generation model. The attacker then uses the trained model to create a rule set that is used to generate context-free grammar strings to crack a password. The evaluation framework used by embodiments may imitate the attacker's password cracking strategy during the calculation of the password's complexity and strength. Another exemplary rule could encompass password attacking informed by a user's online presence. To develop this rule, an attacker may scrape social media platforms (e.g., Facebook™, LinkedIn™, etc.) where a user has a presence to extract possible phrases from structured/unstructured text, pictures, videos, or other elements of the user's account that can be used to derive a password. These phrases can be used alone or combined with other rule sets (e.g., a word list) to create a combination of rules. If the attacker has access to social media profiles of the users, the attacker probably knows the alphabet associated with the password that the attacker is trying to crack. However, even if the attacker does not know the alphabet, the attacker can try different alphabets or all ASCII characters. In some cases, the attacker can add to the pool of all possible passwords by using different dictionaries (e.g., if the user's Facebook™ page has posts in English and French, the attacker can use these both dictionaries.) The evaluation framework used by embodiments may mimic the attacker's password cracking strategy by extracting information from social media to assign to the attacker knowledge of relevant data that is publically available on social media when calculating the password's complexity and determining the password's strength.

FIG. 1 depicts an exemplary evaluation engine 100 in an exemplary embodiment. It will be appreciated that the evaluation engine 100 may be provided as a stand-alone application or other computer process executable by a computing device. In one embodiment, the evaluation engine may generate a user interface to receive input manually entered by a user. In another embodiment, the inputs described herein may be programmatically received without selection by a user. The evaluation engine 100 may provide a rule-based approach that can use combinations of an upper bound, a lower bound, a chain rule, and an order-aware chain rule to calculate the complexity and strength of a password, p. The evaluation engine 100 can receive a password p 102 as an input. In some embodiments, a user can provide all or a subset of rules Ξ 104, an alphabet α along with the minimum and maximum allowable length of p 106, user-defined strength parameters 108 (e.g., password storage and adversarial capabilities), and a user-defined order of rules 110. In one embodiment, the evaluation engine may also accept a user-defined maximum complexity value 112. The user-defined maximum complexity value 112 provides an opportunity for a user to specify an estimate of maximum complexity based on the user's perception and confidence of input rules and thus change the maximum size of the search space. In one embodiment user-defined maximum complexity value 112 may be directly supplied by a user. In another embodiment the maximum complexity value 112 may be a value originally determined by another password complexity estimator. Further, the evaluation engine 100 may additionally receive user-defined parser rules 114 as an input. Alternatively, default inputs may be used in place of some or all of the user-provided inputs by the evaluation engine 100. For example, the evaluation engine 100 may include default rules 104', a default alphabet α along with the minimum and maximum allowable length of p 106', a default order of rules 110', default parsing rules 114' and other default inputs.

In some embodiments, the evaluation engine 100 can output η, a FAT—strength estimate 130 (i.e., 0 or 1), or a complexity and/or normalized complexity 132 of p in relation to lower and upper bounds of complexity. The user supplied parser 114 or default parser 114' can extract parsings of p. In some embodiments, the parser can have one or more options including using default algorithms p→[P], using user-defined algorithms p→[p]⊆[P], or locating p in a precalculated set of all possible passwords 116 based on the input rules. The output of the parser 114 or default parser 114' can be a list of parsed results of p or a corresponding position of p in $\mathbb{X}(\alpha)$. A complexity calculator 118 can take the user-defined parser's output or the default parser's output as an input. The complexity calculator 118 can calculate the complexity of p 102 based on the provided parsings, or it can use a pre-calculated Ξ and then map p into the minimum search space (i.e., complexity). The complexity calculator 118 can output complexity or normalized complexity 132 of p 102. In accordance with various embodiments, the FAT—strength calculator 120 output can be binary. For example, $H_1$ may mean that the FAT-strength calculator 120 outputs 1 and $H_0$ may mean that the FAT-strength calculator outputs 0.

Password entropy is commonly used to indicate a measure of protection provided by p and increases with the number of characters required for a password. The size of a search space containing all possible passwords with alphabet α, $\mathbb{X}(\alpha)$, identifies the complexity for randomly generated passwords. The larger the password search space, the more difficult the password is to crack by brute-force attack.

Figure 2A:
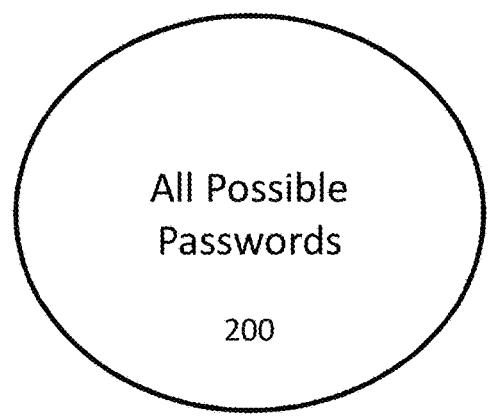
FIGS. 2A-2D depict exemplary search spaces for an alphabet based on rule sets in an exemplary embodiment.

FIGS. 2A-2D depict exemplary search spaces for an alphabet based on rule sets in an exemplary embodiment. FIG. 2A depicts a search space 200 made up of all possible passwords from an exemplary alphabet. It will be appreciated that without some sort of constraint like a maximum number of characters, the search space would be infinite.

Figure 2B:
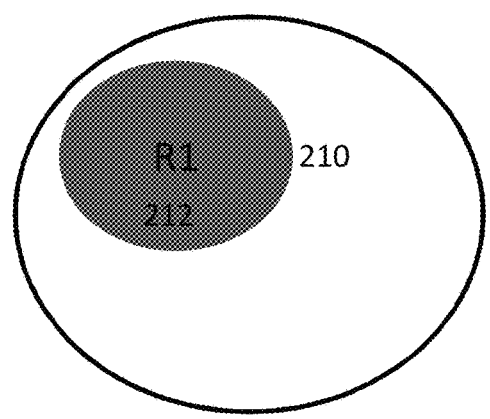

FIG. 2B depicts an exemplary search space 210 for an alphabet in which the rule set consists of passwords based on a single rule, R1 212. For example, R1 212 might indicate that the password is an eight-character password and the alphabet has only lowercase English letters (i.e., ξ:α={lowercase English letters}×aux={no more than eight characters}→$2^{\mathbb{X}(\alpha)}$). In this instance, there are more than 200 billion possible ways to create a password p, |$\mathbb{X}(\alpha$: lowercase english letters)|=$26^8$ in the search space if the password is completely random.

Figure 2C:
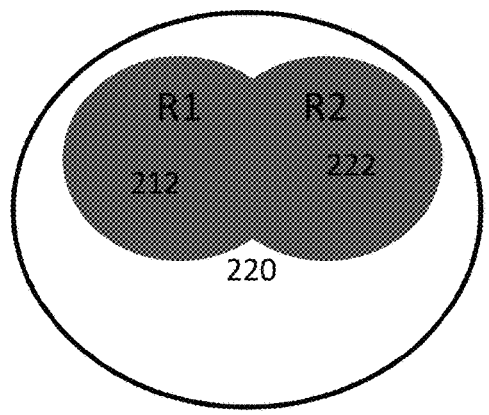

FIG. 2C depicts an exemplary search space 220 for an alphabet in which the rule set consists of a two rules, the previous described rule R1 212 and a second rule, R2 222. For example, R2 222 might indicate that the password also includes at least one upper case English letter. This greatly expands the size of the search space as the possibilities increase from $26^8$ to $52^8$ possibilities:

$$\xi:\alpha=\{\text{lowercase English letters}\} \wedge \{\text{at least one upper case English letter}\} \times aux=\{\text{no more than eight characters}\} \to 2^{\mathbb{X}(\alpha)}.$$

Figure 2D:
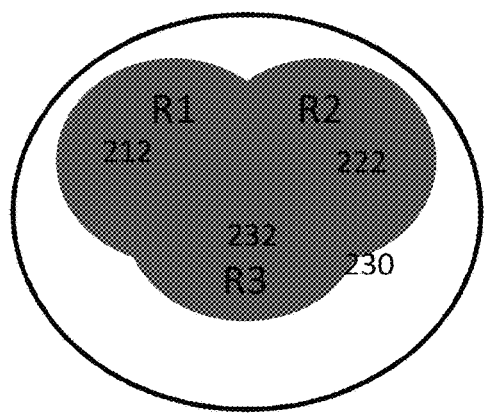

FIG. 2D depicts an exemplary search space 230 for an alphabet in which the rule set consists of a three rules, the previous described rules R1 212 and R2 222 and a third rule, R3 232. For example, R2 222 might indicate that the password also includes at least one number (i.e. 0-9). This further expands the size of the search space as the possibilities increase from $52^8$ to $62^8$ possibilities with the addition of the third rule in the rule set.

$$\xi:\alpha=\{\text{lowercase English letters}\} \wedge \{\text{at least one upper case English letter}\}\{\text{at least one number}\} \times aux=\{\text{no more than eight characters}\} \to 2^{\mathbb{X}(\alpha)}. \quad \text{[check notation form]}$$

It will be appreciated that changing the length of the password instead of or in addition to adding new rules to the rule set may also expand the search space.

Figure 2E:
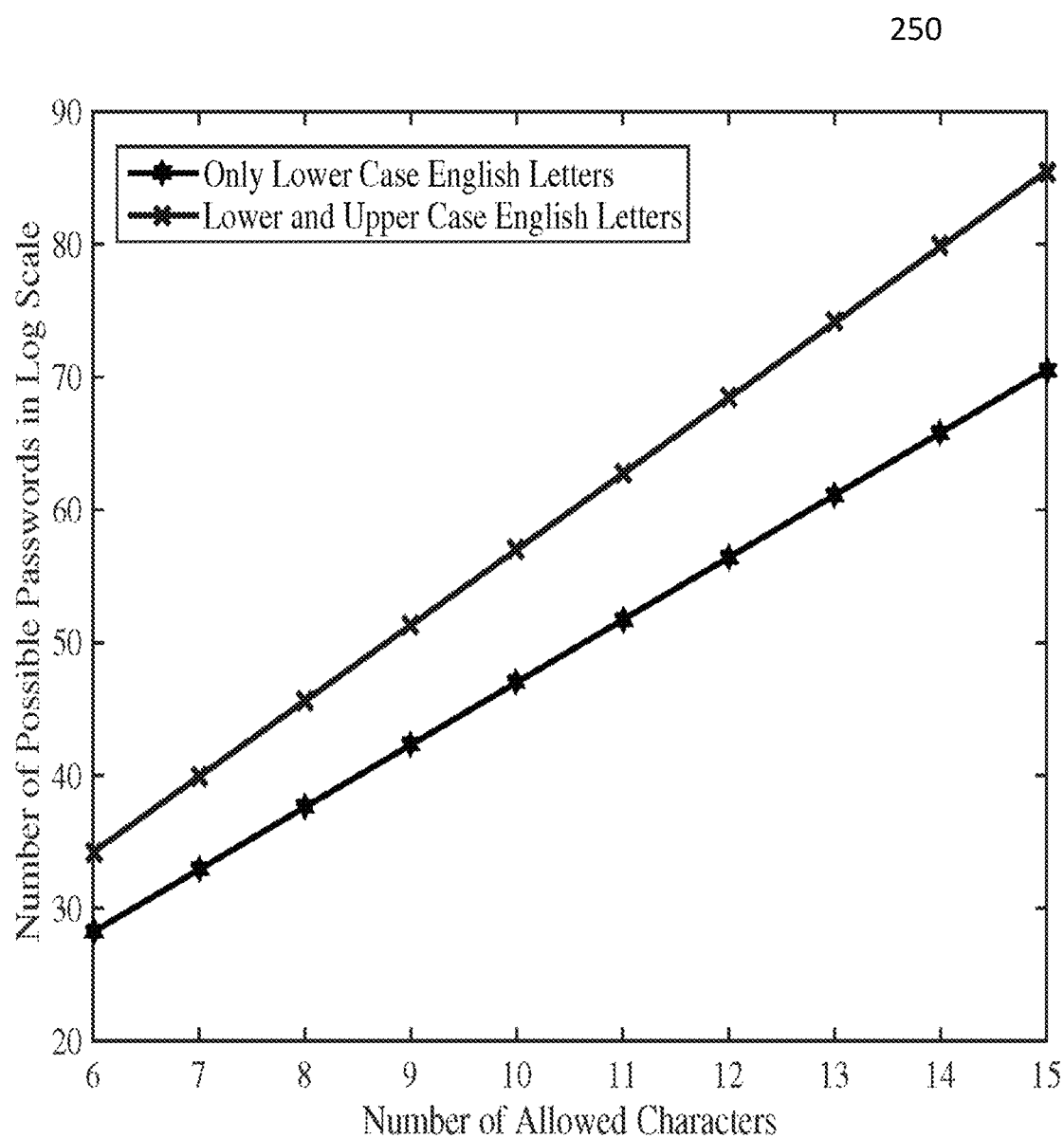
FIG. 2E depicts an exemplary chart representation of a search space in an exemplary embodiment.

A different representation that highlights how the size a search space of all possible passwords, |$\mathbb{X}(\alpha)$|, changes with respect to the allowed length and size of alphabet is shown in FIG. 2E. FIG. 2E provides a chart 250 depicting various combinations of lower and uppercase letters (i.e., α={lower- and upper-case English letters}×aux={number of letters is l∈[6,15]}→$2^{\mathbb{X}(\alpha)}$) and password length versus the number of different ways to create a password in log scale.

If an attacker knows the allowed length of p and that the password only uses lowercase letters, at rates of thousands to trillions of password attempts per second, it could take $2\times10^8$ to 0.2 seconds, respectively, to crack the password by using brute force. The rate of attempt to guess a password can vary widely based on the attacker's hardware capabilities, which can range from primitive software on outdated hardware for an everyday attacker to a dedicated infrastructure with state-of-art software algorithms for a state-sponsored cyber team.

If an attacker has no knowledge of the password policy requirements under which the password is generated, the attacker theoretically would need to search all of the possibilities in the search space. In practice, an attacker frequently will have some knowledge of the password requirements and in one embodiment, the evaluation engine allows this knowledge to be accepted as an input to limit the projected search space of the attacker. In some embodiments, the evaluation engine enables a user to adjust the input of the attacker's knowledge in order to run multiple simulations whose results may be compared.

When an adversary A gains more information about the possible password space $\mathbb{X}(\alpha)$, the complexity of a password decreases. This concept follows from the idea that combining multiple rules produces a corresponding rule set that is the union of the individual rule sets and is a subset of the profinite set. In various embodiments, the evaluation engine may identify the difference between probabilities of the adversary A guessing p with and without prior knowledge.

Figure 3A:
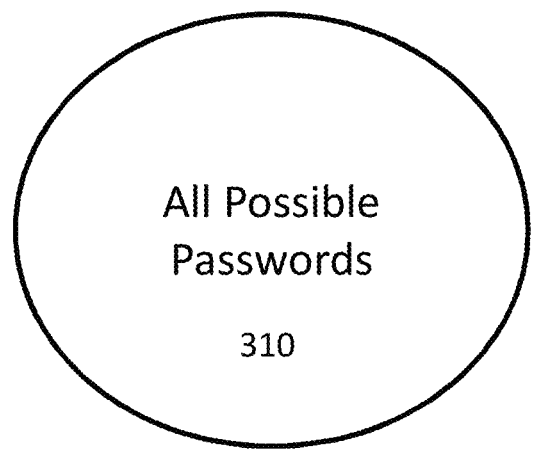
FIGS. 3A-3B depict the effect of a potential attacker's knowledge of password requirements on a search space in an exemplary embodiment.
Figure 3B:
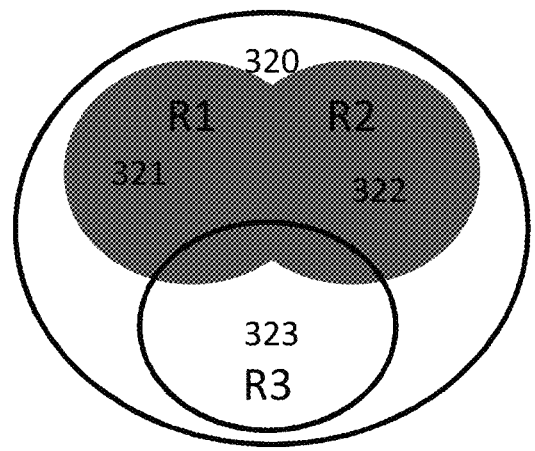

FIGS. 3A-3B depict the effect of a potential attacker's knowledge of password requirements on a search space in an exemplary embodiment. In FIG. 3A, a search space 310 containing all possible passwords for a given alphabet with unknown password policy requirements. FIG. 3B represents a search space 320 for the given alphabet in which passwords have been chosen based on a rule set containing rules R1(321), R2 (322) and R3 (323). Passwords based on the rule set, that is passwords that comply with subsets of the search space set forth in rules R1 (321), R2 (322) and R3 (323) represent only a portion of the overall search space 310. In this example, an attacker knowing about R1 (321) and R2 (322) (but not R3 (323)) could eliminate any passwords not complying with R1 and R2 from its search space. This adjusted search space is smaller and therefore may be searched more quickly. It will be appreciated that if the attacker knew all 3 rules that the search space would be further restricted. By acknowledging and accounting for this fact, the evaluation engine utilized by embodiments, presents a more accurate picture of password complexity password strength when evaluating a password, password policy requirements and/or the accuracy of a password strength estimator.

As previously noted, password complexity can depend on the password-design process. Maximum password complexity can be achieved when each password character is independently drawn from a uniformly distributed alphabet, i.e., the maximum entropy is achieved. In accordance with various embodiments, the password strength can be judged in relation to an upper bound and lower bound of password strength for passwords having similar characteristics. Often, password-policy requirements specify a minimum password length, denoted by k, and alphabet, α. In some embodiments, the evaluation engine can obtain maximum password length from one or more of a value defined by password policy, the length of the longest password, denoted by l, from a password database storing existing passwords, or by user specification of the length of the maximum password. The upper bound can be calculated as:

$$\eta_{upper} = \left| \sum_{i=k}^{l} (\alpha)^i \right| \quad 2$$

$\eta_{upper}$ is $|\mathbb{X}(\alpha)|$ (i.e., the cardinality of all possible passwords) and the upper bound is the same for any rule in the set of rules and a disjoint set $\xi_i$ of $\mathbb{X}(\alpha)$.

In one embodiment, the evaluation engine may use the following equation to provide a lower bound $(\eta_{lower/\Xi}(p))$ on an adversary's effort to guess a password p based on the rule-based complexity measure described herein:

$$\eta_{lower/\xi}(p) = \begin{cases} \min(|\xi_1|, \ldots, |\xi_N|, \ldots), \exists |\xi_1| \text{ is bounded} \\ \eta_{upper}, \text{otherwise} \end{cases} \quad 3$$

where $i \in \mathbb{Z}^+$. When a password p is not part of a given rule set $\xi_i$, the calculation of the lower bound $|\xi_i| \to \infty$. As shown in Eq. 3, $\eta_{lower/\Xi}(p)$ may have one of two possible outcomes. If a password is not a member of $\Xi$, the lower and upper bounds are equal. The complexity of p is equal to $|\xi_i|$ when the password is a part of the corresponding rule set, $\xi_i$. In some situations, p may be generated by more than one rule in which case the evaluation engine evaluates the password complexity of p as the smallest cardinality of all of the rules that can generate p.

In one embodiment, the evaluation engine may apply a chain rule in situations where there is more than one pattern in a password p and an adversary A needs to use the combination of rules to crack the password. Due to the increased prevalence of improved password policies and richer alphabets, passwords more frequently have multipart structures such as combinations of upper-case letters, lower-case letters, numbers, and characters. In one embodiment, the evaluation engine defines the rules as a part of $\mathbb{X}(\alpha)$, and each rule generally represents a small portion of $\mathbb{X}(\alpha)$. For example, if α is lower-case English letters and numbers from zero to nine, a rule including only dictionary words represents a small portion of $\mathbb{X}(\alpha)$. Thus, it is expected that a given password can, in general, require the combination of various rules to generate. The calculation of the complexity reflects an accumulation of these small search spaces defined by the combination of rules and/or a rule as shown below:

$$\eta_{lower/c}(p) = \begin{cases} \min(|c_1|, \ldots, |c_r|, \ldots), \text{if } \exists |c_r| \text{ is bounded,} \\ \eta_{upper}, \text{otherwise,} \end{cases} \quad 4$$

where c represents all possible combinations of rules in $\Xi$ and $r \in \mathbb{Z}^+$. In an embodiment, the evaluation assumes that if a password p is not a member of a subset $c_i$, then $|c_i| \to \infty$, where $i \in \mathbb{Z}^+$. For example, $c_i$ might be a rule of dictionary words (dict.) or it might be a combination of two rules such as the first character of a password is a number and the rest of a password is dictionary words $$\left( \text{e.g., } \underset{\text{number}}{1} \underset{\text{dict.}}{\text{Love}} \underset{\text{dict.}}{\text{Soccer}} \right).$$

Brute-force (or exhaustive search) attack is usually the last resort employed by an attacker to crack a password because it is the least efficient method as it requires systematic trial of all possible combinations. Of course, brute-force can always crack a password when there is no time constraint. It will be appreciated that this is sometimes the equivalent of saying California is within walking distance of Massachusetts, i.e. possible but not practical. However, if a password has a predictable structure, exhaustive search becomes more feasible.

In accordance with various embodiments, systems and methods described herein can use a default or user-defined password parsing mechanism in order to extract patterns in a given password. In an exemplary embodiment, the parser can use an alphabet to extract the patterns in a given password. By parsing the password to extract patterns, the rule-based complexity engine can provide better feedback to a user. The alphabet used by the parser can be parser-specific or can be a non-specific or common alphabet provided by default. As an example, assume that a parser uses lower and upper case English letters and digits from zero to nine as an alphabet (ω=26+26+10=62) to identify patterns in a password following a policy that the password has one number only and at least three consecutive letters. The input password 1LoveSoccer can be parsed by the parser in a number of different ways such as 1-Love-Soccer, 1-Lov-eSoccer, 1-LoveS-occer, etc. The evaluation engine executes the rule-based complexity calculator to compare all of the parsed results with a given rule and find the minimum search space to calculate the complexity of the password. For example, given two separate rules, namely digits ($\xi_1$) and 20,000 dictionary words ($\xi_2$), to check these parsed passwords, all extracted patterns are compared to these rules to calculate password complexity. For instance, the password 1-Love-Soccer. $\xi_1$ provides 10 possibilities for 1 (i.e.: 0 . . . 9) and ∞ for both Love and Soccer and $\xi_2$ gives ∞ for 1, and 20K possibilities for both Love and Soccer. Note: for the purpose of readability, log scale is used for the following calculations. Thus, $\rho_{(1-Love-Soccer)}=\log_2(10\times20K\times20K)=31.8974$. The complexity calculation for 1-Lov-eSoccer. $\xi_1$ gives 10 for 1, and ∞ for both Lov and eSoccer and $\xi_2$ provides ∞ for each of 1, Lov, and eSoccer. Thus, $\rho_{(1-Lov-eSoccer)}=\min(\log_2(62\times62^3\times62^7), \log_2(10\times62^3\times62^7))=65.4962$. After calculating all possible parsed results, the complexity of the password ILoveSoccer is defined by the minimum calculated value, i.e., $\min=(\rho_{(1-Love-Soccer)}, \rho_{(1-Lov-eSoccer)}, \ldots)=\rho_{(1-Love-soccer)}=31.8974$. This minimum search space that takes into account the attacker's knowledge of password policy requirements provides a more accurate view of the obstacle, or lack thereof, to an attacker achieving its goal of cracking a password.

In brute-force cracking, an attacker tries every possible string in $\mathbb{X}(\alpha)$ until it succeeds. More common methods of password cracking, such as dictionary attacks, pattern checking, word list substitution and so on attempt to reduce the number of trials required and will usually be attempted before an exhaustive search. In other words, there are probable paths that an attacker can try to recover a password before trying all combinations in $\mathbb{X}(\alpha)$. In one embodiment, an order of these probable paths, for example, that an attacker checks dictionary words before word list substitution, are accepted as inputs into the evaluation engine to incorporate this information into the complexity calculation as shown below:

$$\eta(p)=\min(\eta_{upper},(|\xi_i|+|\xi_j|+\ldots+|\xi_k|)) \quad 5$$

where p is generatable by $\xi_k$ and an attacker A tries $\xi_i$ before $\xi_j$, $\xi_j$ before $\xi_k$ and so on. $\forall \xi_i \in \mathbb{X}(\alpha), i \in \mathbb{Z}^+$.

The order of rules employed by the attacker may be represented by the evaluation engine as a directed graph. In the case of the above example, the directed graph has three nodes and two edges, $G=(V_1, E_1)$, where $V_1=(\xi_i, \xi_j, \xi_k)$, $E_1=(a_{ij}, a_{jk})$, and $a_{ij}=(\xi_i, \xi_j)$, $a_{jk}=(\xi_j, \xi_k)$. The order of evaluation of a password $p \in \mathbb{X}(\alpha)$'s complexity is $\xi_i, \xi_j$, and then $\xi_k$.

When there is no idea about the order of rules, the complexity calculations performed by the evaluation engine can use the minimum of all possible orders to provide a lower bound to a user as shown below:

$$\eta_{lower}(p) = \min\left\{\eta_{upper}, \left|\binom{\Xi}{i}\right|_{i=[1,\infty)}\right\} \quad 6$$

As described herein, Password FAT-strength determined by the evaluation engine is a calculation of the effectiveness of a password in resisting guessing and brute-force attacks.

Previous password strength estimators tend to categorize a password as very weak, weak, strong, or very strong. Conversely, embodiments can express password strength as an estimated time-to-crack based on additional information of an attacker's resources such as an adversary's computational power provided as an input to the evaluation engine. The estimation of password strength provided by the evaluation engine utilized by embodiments is a function of endurance to brute-force attack. The evaluation engine consider factors that can be used by an adversary to calculate a password's FAT-strength. For example, one or more rules can be extracted from a user's online presence (e.g., Facebook™ account). When a user creates a password using personal information that is publicly available, the evaluation framework described herein incorporates this available information into the set of rules $\Xi$.

In one embodiment, if $p \in \xi_i$, then the FAT-strength calculation produced by the evaluation engine may include this information in the cardinality of the complexity as given below:

$$F \times s(t) \times \frac{1}{\mu_p(t)} \times |\eta|_{<H_0}^{>H_1} T$$

where F is a function of a type of password storage (e.g., a one-way hash function), s(t) is the computation power used by an adversary to crack a password p, $\mu_p(t)$ is the number of parallel processors, and T shows the acceptable time-to-crack. In various embodiments, the acceptable time-to-crack T can be defined by a user or can be calculated or obtained from a password change policy. $H_1$ represents FAT-strong p and $H_0$ represents a scenario in which p is not FAT-strong. In an embodiment, the computational power s(t) is a function of time that incorporates an expected future effect of Moore's law (see Table 1) while calculating the FAT-strength.

| Year | Relative Computing Power |
|---|---|
| 2016 | 1x |
| 2026 | 32x |
| 2036 | 1024x |
| 2046 | 32768x |

Figure 4:
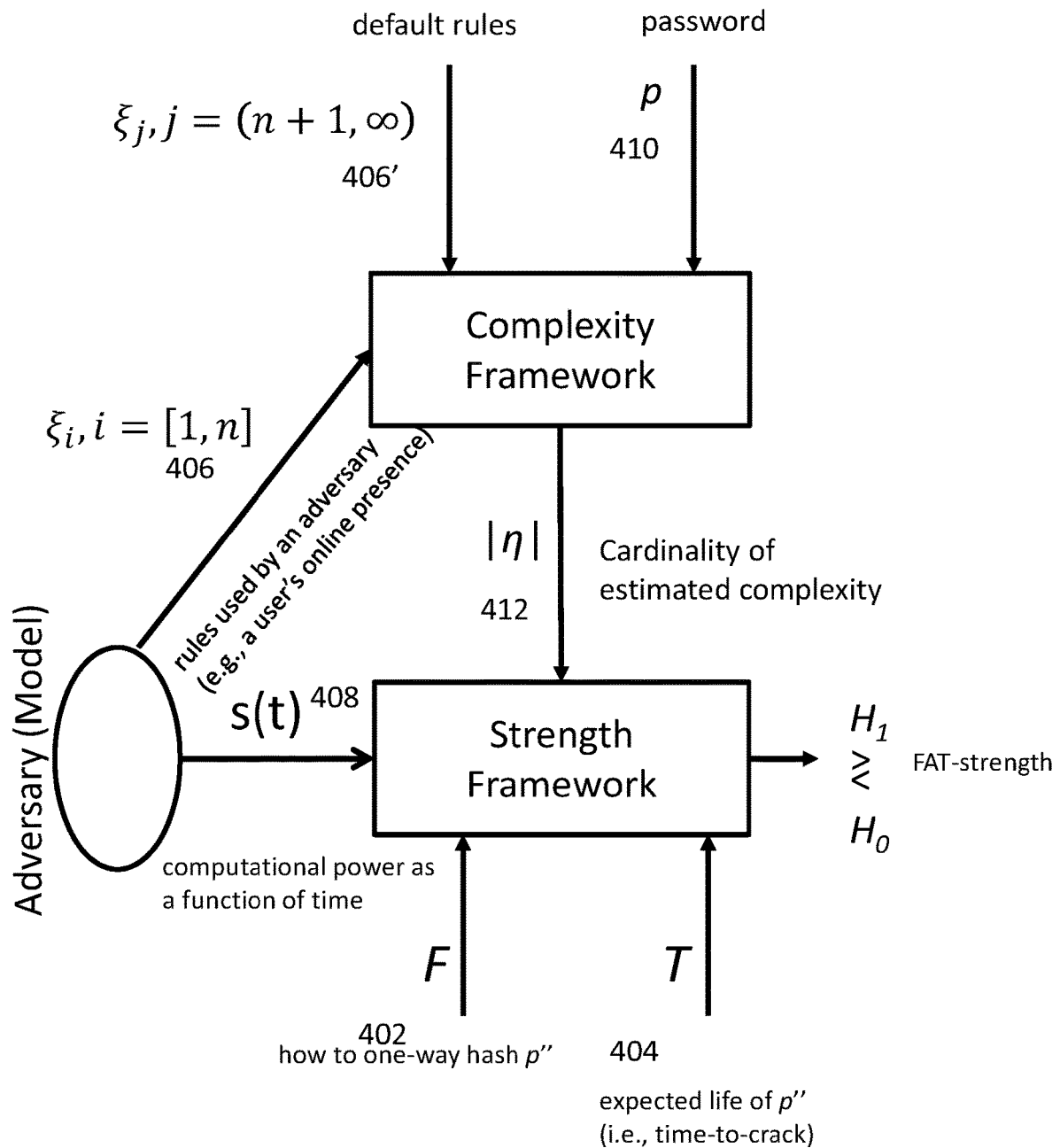
FIG. 4 depicts a high-level model of a FAT-strength calculation in an exemplary embodiment.

FIG. 4 depicts a high-level model of a FAT-strength calculation in an exemplary embodiment. The evaluation engine may receive password protection methods, F (402), and the expected life time, T (404), as auxiliary parameters. In this formulation, certain rules $\xi_i$, $\forall i \in [1, n]$ 406 (or default rules 406') and the computational power s(t) 408 can be used to model adversarial capabilities. In exemplary embodiments, s(t) 408 follows Moore's law (i.e., an adversary's computational capacity doubles every other year) However, it should be understood that different functions can be used to model s(t) 408 according to particular requirements or specifications. For example, if an adversary is a known state actor and improves its computation capacity every month, this information can be incorporated into s(t) 408. In exemplary embodiments, the evaluation engine provides the cardinality of an estimated complexity of p (410). As noted above, various numbers of complexities can be calculated by the evaluation engine. For example, $|\eta|$ 412 is the minimum of all calculations if a user does not enforce a certain complexity calculation (e.g., order aware chain rule complexity.) The evaluation engine may use the binary test of hypothesis to decide between $H_1$ and $H_0$ which indicates whether or not p is FAT-strong 414.

Figure 5:
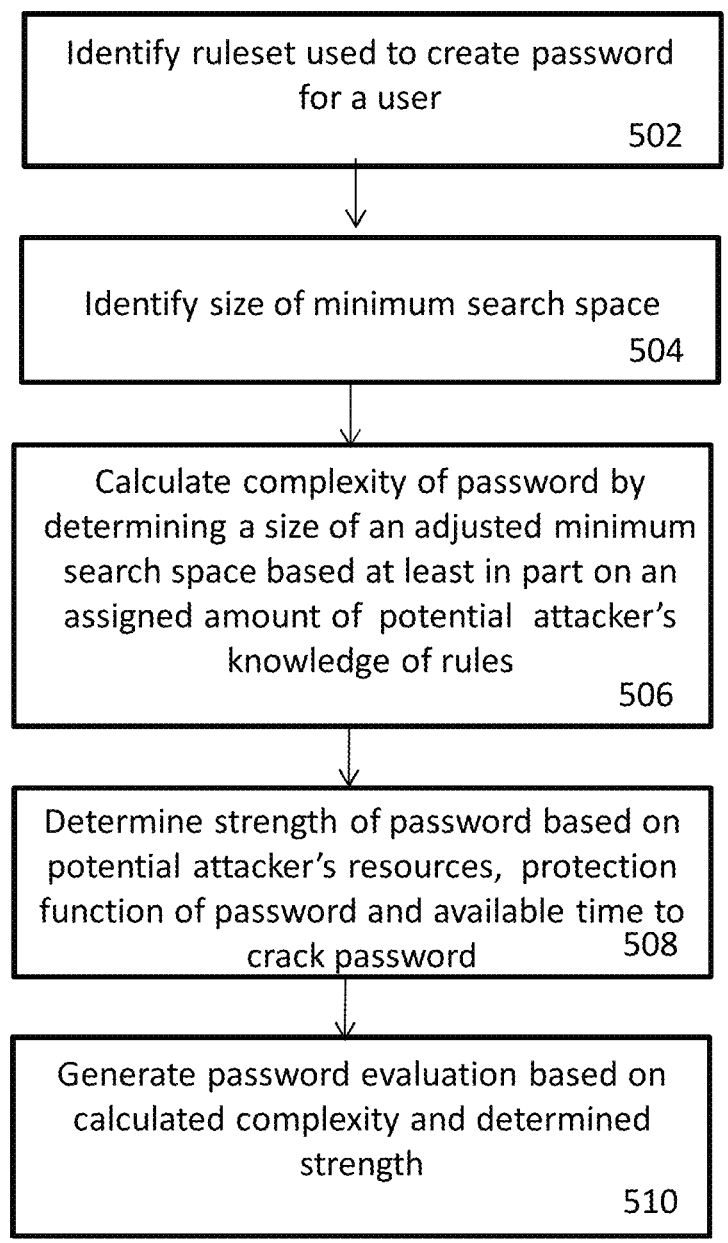
FIG. 5 is a flowchart depicting an exemplary sequence of steps for evaluating a password in an exemplary embodiment.

As described herein, the evaluation engine of exemplary embodiments calculates complexity and determines password strength for a password. FIG. 5 is a flowchart depicting an exemplary sequence of steps for a method of evaluating a password in an exemplary embodiment. It will be appreciated that the method is programmatically performed by one or more computer-executable processes executing on, or in communication with, one or more computing devices. The sequence begins with the identification of a rule set used to create a password for a user (step 502). As explained herein the rules may be provided as input by a user or entity seeking the analysis or may be otherwise determined. The evaluation engine then identifies a size of a minimum search space for the password based on the previously identified rule set (step 504). The evaluation engine receives an assigned amount of knowledge of a potential attacker regarding the rules in the rule set and calculates the complexity of the password by determining an adjusted minimum size of the search space based at least in part upon a potential attacker's knowledge of rules in the search space (step 506). In one embodiment, the assigned amount of attacker's knowledge may be provided as an input into the evaluation engine by a user. In another embodiment, the assigned amount of the attacker's knowledge may be programmatically provided based upon pre-determined default values. The evaluation engine then determines a strength of the password based on a potential attacker's resources, a protection function of the password and an amount of time available to the attacker to crack the password in view of the adjusted minimum search space (step 508). The evaluation engine may then generate an evaluation of the password (step 510). In one embodiment, the evaluation includes separate values for password complexity and strength provided to a user. In another embodiment, values for password complexity and strength as determined by the evaluation engine are combined into a single value that is transmitted to, and/or displayed to, the user.

Figure 6:
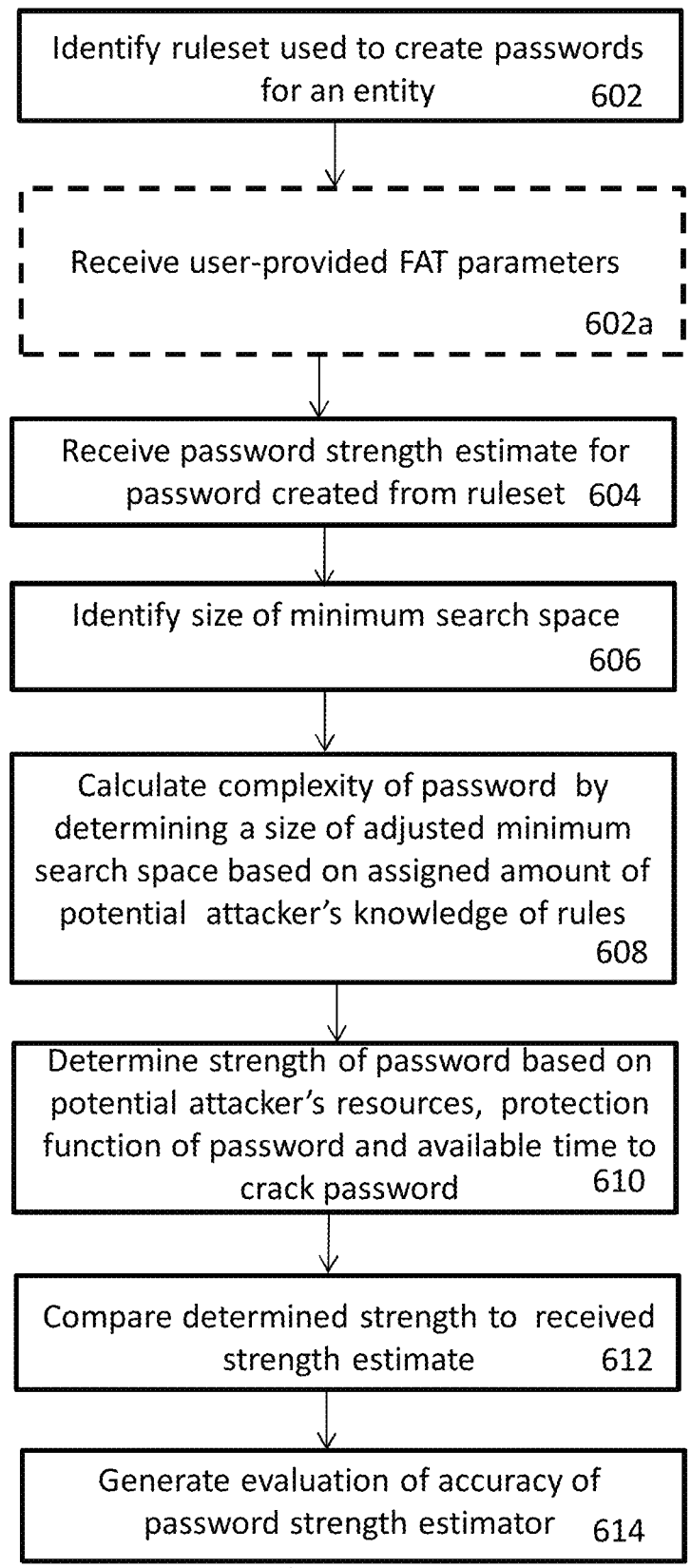
FIG. 6 is a flowchart depicting an exemplary sequence of steps for evaluating accuracy of a password strength estimator in an exemplary embodiment.

FIG. 6 is a flowchart depicting an exemplary sequence of steps for performing a method to evaluate the accuracy of a password strength estimator in an exemplary embodiment. It will be appreciated that the method is programmatically performed by one or more computer-executable processes executing on, or in communication with, one or more computing devices. The sequence begins by identifying a rule set used to create passwords for an entity with the evaluation engine (step 602). The rule set may be provided as input or may be programmatically determined. A user or entity may also optionally provide FAT parameters to be used in the evaluation indicating the protection function (F) used on the password, the attackers resources (A) and the time available to crack the password (T) (step 602a). A password strength estimate of a password is received that was generated by a password strength estimator that is being evaluated (step 604). For example, a company may wish to have its own password strength estimator evaluated by the evaluation engine and may provide an estimate of password strength produced by the estimator to the evaluation engine. The evaluation engine then identifies a minimum search space based on the rule set (step 606) and calculates a complexity of the password (that is having its strength estimated by the password strength estimator) by determining a size of an adjusted minimum search space based on an assigned amount of a potential attacker's knowledge of the rules in the rule set (step 608). The evaluation engine then determines a strength of the password based on a potential attacker's resources, a protection function of the password and an amount of time available to the attacker to crack the password in view of the adjusted minimum search space (step 610). The determined strength produced by the evaluation engine may then be compared to the estimate of password strength received from the password strength estimator being evaluated (step 612) and a generation of the accuracy of the password strength estimator may then be provided to the entity seeking the evaluation (step 614).

Figure 7:
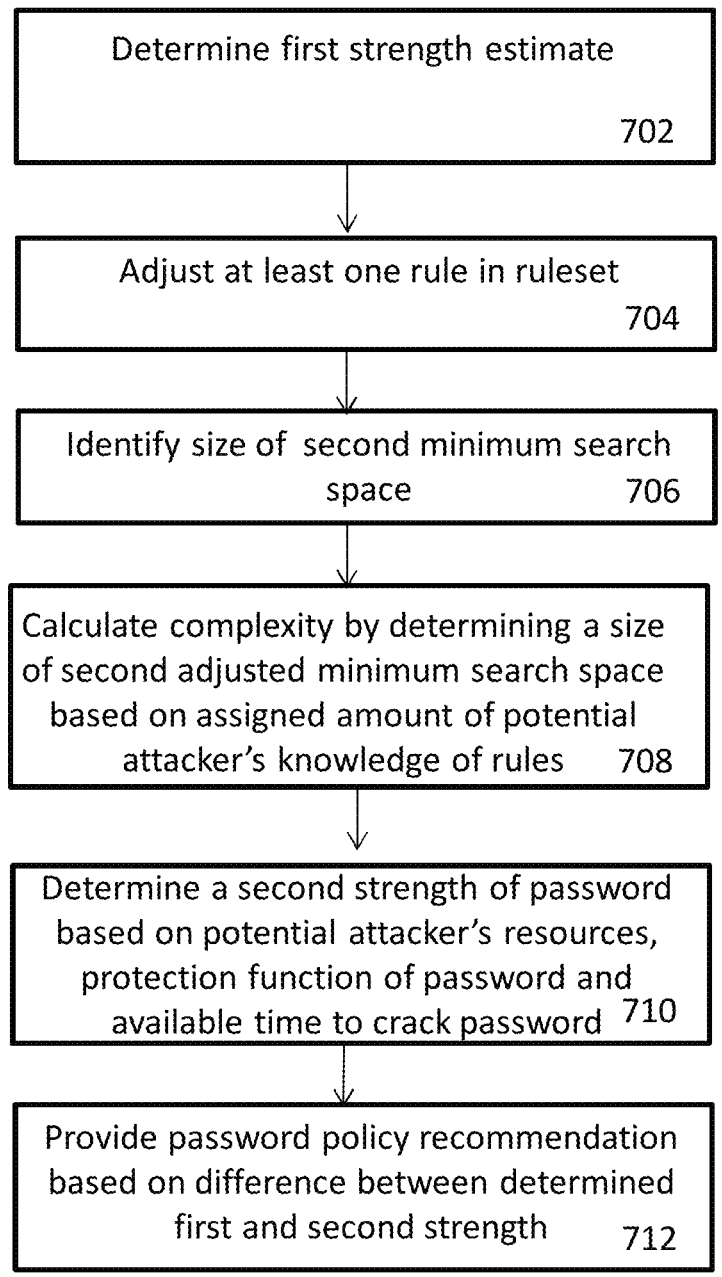
FIG. 7 is a flowchart depicting an exemplary sequence of steps for generating password policy recommendations in an exemplary embodiment.

In one embodiment, the evaluation engine may enable a user to alter and adjust the capabilities being assigned to a potential attacker so as to generate password policy recommendations for an entity or password suggestions for a user. FIG. 7 is a flowchart depicting an exemplary sequence of steps for performing a method to generate password policy/password recommendations in an exemplary embodiment. It will be appreciated that the method is programmatically performed by one or more computer-executable processes executing on, or in communication with, one or more computing devices. The sequence begins by determining a first strength estimate for a password as previously described herein (step 702). The evaluation engine may then be used to adjust at least one rule in the rule set used to generate the password (step 704). For example, the evaluation engine may receive a user selection to increase the required number of characters in the password or some other existing criteria or may add an additional rule or rules to the rule set. The evaluation engine may then determine a search space (a second search space) for the password in light of the adjusted rule set (step 706) and may calculate complexity for the password by determining a size of a second adjusted search space that takes into account an assigned amount of a potential attacker's knowledge of the rules in the adjusted rule set (step 708). The evaluation engine may then determine a second strength of the password produced from the altered rule set based on the potential attacker's resources, a protection function of the password and an amount of time available to the attacker to crack the password (step 710). Following the determination of the second strength, the evaluation engine may generate a password policy recommendation for a user or entity based on the difference between the determined first and second strengths (step 712). For example, if the evaluation engine determines that the second strength is stronger than the first strength, the evaluation engine may generate a suggestion for the entity or user to switch their password or password requirements in line with the tested altered rule set. In another embodiment, the evaluation engine may be in communication with the entity requiring the password and the change to the password policy requirements may occur automatically following the determination of the increased security available from the altered rule set.

Figure 8:
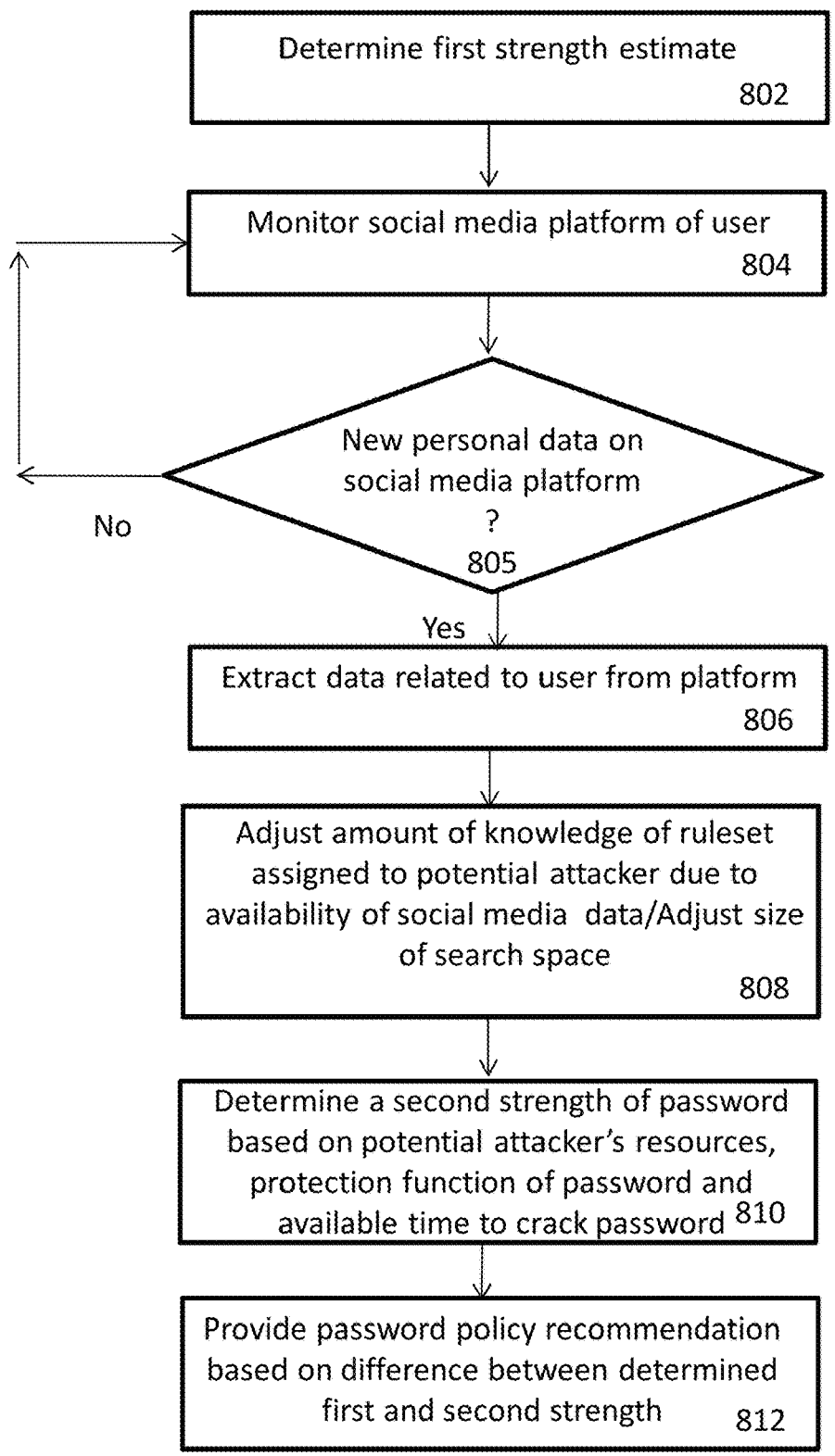
FIG. 8 is a flowchart depicting an exemplary sequence of steps for evaluating a password based on available social media data in an exemplary embodiment.

In one embodiment, social media data may be used to assist in initially determining the strength of a password. In another embodiment, the social media data may be used to alter a previous determination of password strength. FIG. 8 is a flowchart depicting an exemplary sequence of steps for evaluating a password based on social media data in an exemplary embodiment. It will be appreciated that the method is programmatically performed by one or more computer-executable processes executing on, or in communication with, one or more computing devices. The sequence begins with the evaluation engine determining a first strength estimate for a password (step 802). A monitoring module in the evaluation engine may be configured to periodically examine one or more social media platforms such as Twitter™, Facebook™, LinkedIn™, etc. to identify publically available data associated with the user (step 804). In one embodiment, the monitoring module may compare the publically available data to the user's password to see if the data corresponds to all or a portion of the password. For example, information such as children and pet names frequently forms some or all of a user's passwords and potential attackers are known to utilize such information in developing tools to guess a user's password. If no new personal data corresponding to the user's password appears on the social media platform (step 805), the monitoring module continues to monitor. Depending upon implementation, the monitoring may be continual or periodic. If new personal data corresponding to the user's password does appear on the social media platform (step 805), the monitoring module extracts (copies) the data and provides it as additional input to the evaluation engine (step 806). The evaluation engine uses the social media data to adjust the amount of knowledge of the rule set assigned to the potential attacker and recalculates the complexity of the password (by adjusting the size of the search space) based thereon (step 808). In this manner, the fact that the user has made some portion, or all of their password available publicly, albeit in a different context, is considered by the evaluation engine. A second strength of password is then determined based upon the adjusted search space and the F, A, T inputs previously described (step 810). Based on a difference between the determined second strength and the determined first strength (which indicates that the attacker's increased knowledge has now made the password less secure) a recommendation may be generated with respect to the password. For example, in one embodiment a real-time alert may be sent to the user indicating that the user should consider changing their password because of newly posted social media data. In another embodiment, an alert may be sent to an entity associated with the user (e.g. an entity controlling a website requiring the user's password) informing the entity of the user's weakened password along with a suggestion for an immediate change in password. In one embodiment, the discovery of the social media-based password vulnerability may result in the programmatic freeze of the user's login rights. For example, the evaluation engine may be configured to control login access for the entity with which the user is associated and may automatically suspend access until a password change.

It will be appreciated that other uses of social media data are also within the scope of the present invention. For example, without limitation, the analysis of the social media data may also be performed as part of a password enrollment process when the user first chooses his or her password as part of an associated entity's password registration process. If the user attempts to register/enroll a password compromised by social media data discoverable by the monitoring module during the registration process, the evaluation engine may inform the user during enrollment of the need for a different password.

Figure 9:
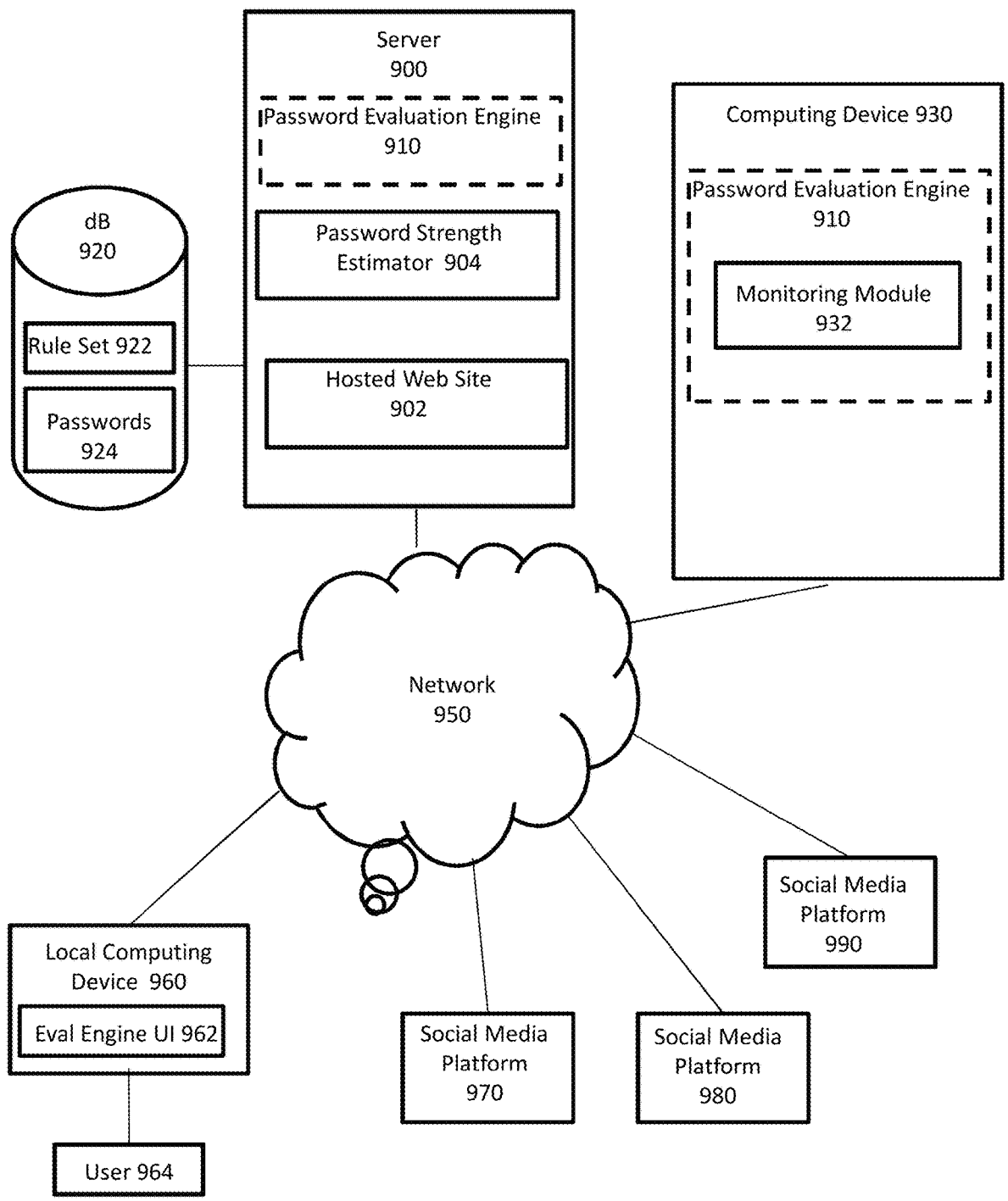
FIG. 9 is an exemplary network environment suitable for practicing an embodiment.

FIG. 9 is an exemplary network environment suitable for practicing a distributed implementation of an exemplary embodiment. The system can include a server 900, a database 920, a computing device 930, a local computing device 960, social media platforms such as social medial platforms 970, 980 and 990 and other components connected by a network 950. It should be appreciated that various other distributed or centralized configurations may be implemented without departing from the scope of the present invention. In exemplary embodiments, computing device 930 can host and execute password evaluation engine 910 and monitoring module 932. Alternatively, in other embodiments, server 900, which may host a web site 902 that requires a password, and may host and execute password evaluation engine 910. Server 900 may also execute its own password strength estimator 904 implemented as a stand-alone application or other executable computing process. In one embodiment, an entity in control of server 900 may have password strength estimator 904 evaluated by password evaluation engine 910. Database 920 may store rule set(s) 922 and passwords 924 utilized by hosted web site 902 which may be provided to evaluation engine 910 as described herein. It will be appreciated that the password evaluation engine and monitoring module functionality may be implemented as a greater or lesser number of elements than illustrated and that other configurations in addition to those illustrated and discussed are also within the scope of the present invention.

In one embodiment, local computing device 960 may be operated by a user 964 who may provide input into the evaluation engine 910 related to the user's password via an evaluation engine user interface 962 displayed on local computing device 962. For example, the evaluation engine user interface 962 may be displayed to the user 964 as part of an enrollment process for a website such as hosted web site 902.

The server 900, computing device 930 and local computing device 960 may be, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The server 900, computing device 930 and local computing device 960 may include some or all components described in relation to computing device 1000 shown in FIG. 10.

The server 900, computing device 930 and local computing device 960 may connect to a network 950 via a wired or wireless connection. The server 900, computing device 930 and local computing device 960 may include one or more applications. In exemplary embodiments, the server 900, database, 920, computing device 930, local computing device 960 and social media platforms may be in communication with each other via the network 950. The network 950 may include, but is not limited to, the Internet, an intranet, a LAN (Local Area Network), a WAN (Wide Area Network), a MAN (Metropolitan Area Network), a wireless network, an optical network, and the like.

Figure 10:
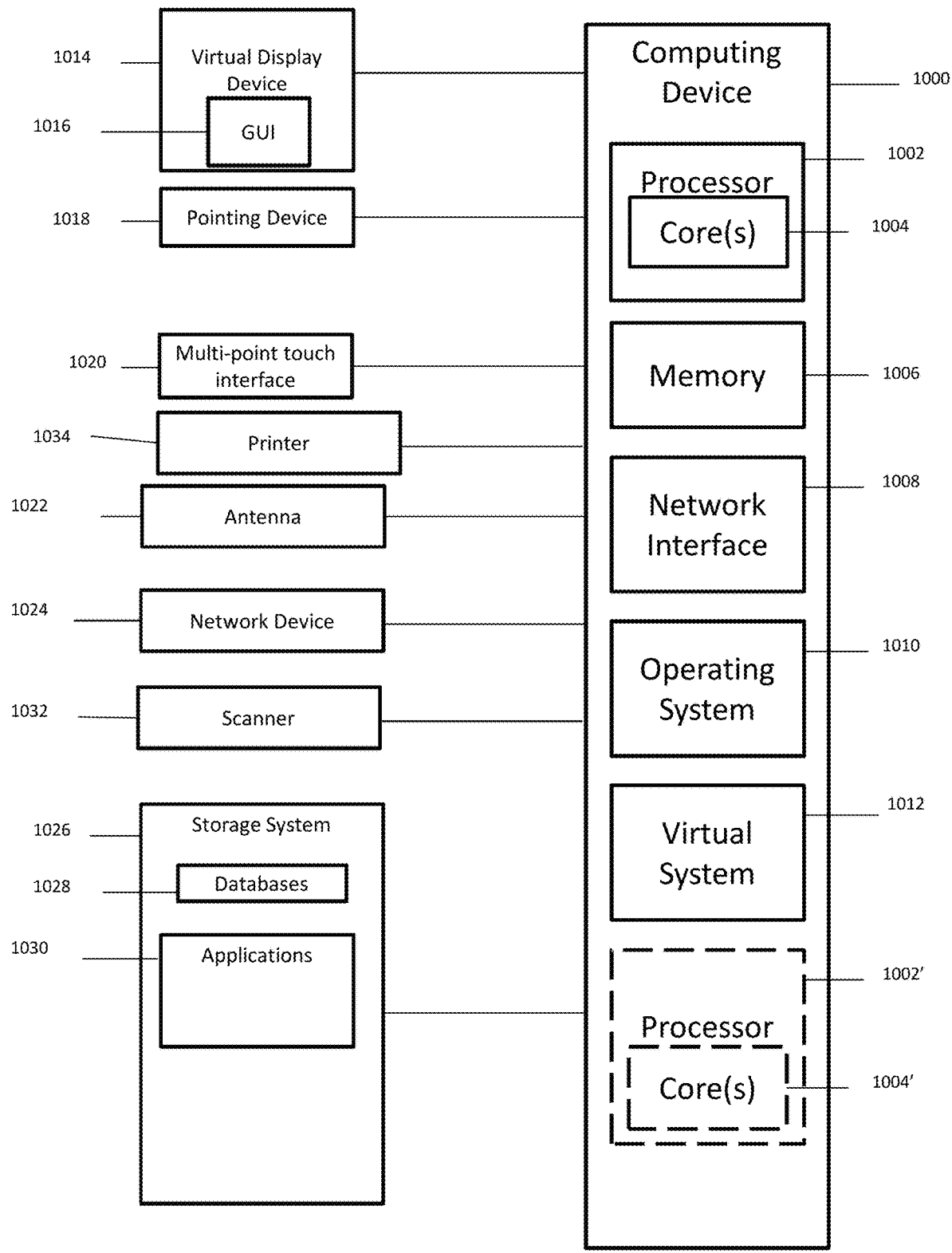
FIG. 10 is an exemplary computing device that may be utilized to practice an exemplary embodiment.

FIG. 10 is an exemplary computing device that may be utilized in an exemplary embodiment to perform the methods described herein. The computing device 1000 includes one or more non-transitory computer-readable media for storing one or more computer-executable instructions (such as but not limited to software or firmware) for implementing methods according to the principles described herein. The non-transitory computer-readable media can include, but are not limited to, one or more types of hardware memory, non-transitory tangible media (for example, one or more magnetic storage disks, one or more optical disks, one or more USB flash drives), and the like.

For example, memory 1006 included in the computing device 1000 can store computer-readable and computer-executable instructions or software for implementing exemplary embodiments such as methods described above in reference to FIGS. 5-8. The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' can each be a single core processor or multiple core (1004 and 1004') processor.

Virtualization can be employed in the computing device 1000 so that infrastructure and resources in the computing device can be shared dynamically. A virtual machine 1012 can be provided to handle a process running on multiple processors so that the process appears to be using only one computing resource rather than multiple computing resources. Multiple virtual machines can also be used with one processor.

Memory 1006 can be non-transitory computer-readable media including a computer system memory or random access memory, such as DRAM, SRAM, EDO RAM, and the like. Memory 1006 can include other types of memory as well, or combinations thereof.

A user can interact with the computing device 1000 through a display unit, such as a touch screen display or computer monitor, which can display one or more user interfaces that can be provided in accordance with exemplary embodiments. The computing device 1000 can also include other I/O devices for receiving input from a user, for example, a keyboard or any suitable multi-point touch interface 1020, a pointing device 1018 (e.g., a pen, stylus, mouse, or trackpad). The multi-point touch interface 1020 and the pointing device 1018 can be coupled to the display unit. The computing device 1000 can include other suitable conventional I/O peripherals. The computing device 1000 can also include a scanner 1032, such as an optical scanner, that can scan and read a machine readable code.

The computing device 1000 can also include one or more storage devices 1026, such as a hard-drive, CD-ROM, or other non-transitory computer readable media, for storing data and computer-readable instructions and/or software, such as an evaluation engine and monitoring module and/or data related thereto that can implement exemplary embodiments of the methods and systems as taught herein, or portions thereof. Exemplary storage device 1026 can also store one or more databases 1028 for storing any suitable information required to implement exemplary embodiments. The databases can be updated by a user or automatically at any suitable time to add, delete, or update one or more items in the databases. Exemplary storage device 1026 can store one or more databases 1028 for storing any other data/information used to implement exemplary embodiments of the systems and methods described herein.

The computing device 1000 can include a network interface 1008 configured to interface via one or more network devices 1024 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1008 can include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 can be any computing device that is capable of communication and that has sufficient processor power and memory capacity to perform the operations described herein.

The computing device 1000 can run operating system 1010, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 1010 can be run in native mode or emulated mode. In an exemplary embodiment, the operating system 1010 can be run on one or more cloud machine instances.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for evaluating a password, comprising:

receiving a rule set used to create a password for a user, the password consisting of a plurality of characters from an alphabet, the rule set required by an entity requiring the password creation and including one or more rules applicable to creating the password;

identifying a size of a minimum search space equal to the smallest subset of passwords that can be created from the alphabet based on the rule set;

calculating a complexity of the password by determining a size of an adjusted minimum search space based at least in part on an assigned amount of knowledge of the one or more rules in the rule set possessed by a potential attacker attempting to crack the password;

determining a strength of the password based on at least an attacker's resources, a protection function used to store the password and a time available to crack the password with respect to the adjusted minimum search space;

generating an evaluation of the password based on the calculated complexity and determined strength; and providing the evaluation to a designated individual.

2. The method of claim 1, further comprising:
receiving a specified order of a search space exploration for a plurality of different types of attacks employed by an attacker; and
performing at least one of calculating the complexity of the password and determining the strength of the password based at least in part on the specified order of search space exploration with respect to the adjusted minimum search space.

3. The method of claim 1, further comprising:
parsing the password to extract a plurality of patterns;
comparing the extracted patterns with at least one of the rules used to create the password; and
identifying the minimum search space based at least in part on the comparing.

4. The method of claim 1 wherein the attacker's resources include at least one of a computational power of an attacker and an amount of parallel processing being used by an attacker.

5. The method of claim 1 wherein the determining of the strength of the password is based at least in part on knowledge of the attacker of the protection function.

6. The method of claim 1 wherein the determined strength of the password is expressed in terms of a length of time needed by an attacker to crack the password.

7. The method of claim 1, further comprising:
monitoring one or more social media platforms on which the user has a presence;
extracting data related to the user from the one or more social media platforms; and
adjusting the amount of assigned knowledge possessed by the potential attacker based on the extracted data.

8. The method of claim 7, further comprising:
providing a programmatically generated alert based on the adjusting of the amount of assigned knowledge, the programmatically generated alert provided to at least one of a user and an entity associated with the password.

9. The method of claim 1, further comprising:
receiving a password strength estimate for the password from an entity using a password strength estimator;
comparing the determined strength to the password strength estimate received from the password strength estimator; and
generating an evaluation of the accuracy of the password strength estimator based on the comparing.

10. A computing device-implemented method for evaluating a password policy, comprising:
receiving an existing rule set used to create passwords for an entity, the passwords consisting of a plurality of characters from an alphabet, the rule set required by the entity and including one or more rules applicable to creating the passwords;
identifying a size of a minimum search space equal to the smallest subset of passwords that can be created from the alphabet based on the rule set;
calculating a complexity of a password by determining a size of an adjusted minimum search space based at least in part on an assigned amount of knowledge of the one or more rules in the rule set possessed by a potential attacker attempting to crack the passwords;
determining a first strength of the password, the determining of the first strength based on at least an attacker's resources, a protection function used to store the password and a time available to crack the password with respect to the adjusted minimum search space;
generating a recommendation for the password policy based on the determined first strength; and
providing the recommendation to a designated individual associated with the entity.

11. The method of claim 10, further comprising:
adjusting at least one of the rules in the rule set;
identifying a size of a second minimum search space equal to the smallest subset of passwords that can be created from the alphabet based on the rule set with the adjusted at least one rule;
determining a size of a second adjusted minimum search space based on an assigned amount of knowledge of the one or more rules containing the adjusted at least one rule that is possessed by a potential attacker attempting to crack the passwords;
determining a second strength of the password, the determining of the second strength based on at least an attacker's resources, a protection function used to store the password and a time available to crack the password with respect to the second adjusted minimum search space; and
providing a password policy recommendation to the entity with respect to the rule set based on a difference between the determined second strength and the determined first strength.

12. The method of claim 10, further comprising:
adjusting the assigned amount of knowledge of the potential attacker;
determining a size of a second adjusted minimum search space based on the adjusted assigned amount of knowledge of the one or more rules possessed by the potential attacker;
determining a second strength of the password, the determining of the second strength based on at least an attacker's resources, a protection function used to store the password and a time available to crack the password with respect to the second adjusted minimum search space; and
providing a password policy recommendation to the entity based on a difference between the determined second strength and the determined first strength.

13. A non-transitory medium holding computing device-executable instructions for evaluating a password, the instructions when executed causing at least one computing device to:
receive a rule set used to create a password for a user, the password consisting of a plurality of characters from an alphabet, the rule set required by an entity requiring the password creation and including one or more rules applicable to creating the password;
identify a size of a minimum search space equal to the smallest subset of passwords that can be created from the alphabet based on the rule set;
calculate a complexity of the password by determining a size of an adjusted minimum search space based at least in part on an assigned amount of knowledge of the one or more rules in the rule set possessed by a potential attacker attempting to crack the password;
determine a strength of the password based on at least an attacker's resources, a protection function used to store the password and a time available to crack the password with respect to the adjusted minimum search space;
generate an evaluation of the password based on the calculated complexity and determined strength; and
provide the evaluation to a designated individual.

14. The medium of claim 13 wherein the instructions when executed further cause the at least one computing device to:
receive a specified order of a search space exploration for a plurality of different types of attacks employed by an attacker; and
perform at least one of calculating the complexity of the password and determining the strength of the password based at least in part on the specified order of search space exploration with respect to the adjusted minimum search space.

15. The medium of claim 13 wherein the instructions when executed further cause the at least one computing device to:
parse the password to extract a plurality of patterns;
compare the extracted patterns with at least one of the rules used to create the password; and
identify the minimum search space based at least in part on the comparing.

16. The medium of claim 13 wherein the attacker's resources include at least one of a computational power of an attacker and an amount of parallel processing being used by an attacker.

17. The medium of claim 13 wherein the determining of the strength of the password is based at least in part on knowledge of the attacker of the protection function.

18. The medium of claim 13 wherein the determined strength of the password is expressed in terms of a length of time needed by an attacker to crack the password.

19. The medium of claim 13 wherein the instructions when executed further cause the at least one computing device to:
monitor one or more social media platforms on which the user has a presence;
extract data related to the user from the one or more social media platforms; and
adjust the amount of assigned knowledge possessed by the potential attacker based on the extracted data.

20. The medium of claim 19 wherein the instructions when executed further cause the at least one computing device to:
provide a programmatically generated alert based on the adjusting of the amount of assigned knowledge, the programmatically generated alert provided to at least one of a user and an entity associated with the password.

21. The medium of claim 13 wherein the instructions when executed further cause the at least one computing device to:
receive a password strength estimate for the password from an entity using a password strength estimator;
compare the determined strength to the password strength estimate received from the password strength estimator; and
generate an evaluation of the accuracy of the password strength estimator based on the comparing.

22. A non-transitory medium holding computing device-executable instructions for evaluating a password policy, the instructions when executed causing at least one computing device to:
receive an existing rule set used to create passwords for an entity, the passwords consisting of a plurality of characters from an alphabet, the rule set required by the entity and including one or more rules applicable to creating the passwords;
identify a size of a minimum search space equal to the smallest subset of passwords that can be created from the alphabet based on the rule set;
calculate a complexity of a password by determining a size of an adjusted minimum search space based at least in part on an assigned amount of knowledge of the one or more rules in the rule set possessed by a potential attacker attempting to crack the passwords;
determine a first strength of the password, the determining of the first strength based on at least an attacker's resources, a protection function used to store the password and a time available to crack the password with respect to the adjusted minimum search space;
generating a recommendation for the password policy based on the determined first strength; and
provide the recommendation to a designated individual associated with the entity.

23. The medium of claim 22 wherein the instructions when executed further cause the at least one computing device to:
adjust at least one of the rules in the rule set;
identify a size of a second minimum search space equal to the smallest subset of passwords that can be created from the alphabet based on the rule set with the adjusted at least one rule;
determine a size of a second adjusted minimum search space based on an assigned amount of knowledge of the one or more rules containing the adjusted at least one rule that is possessed by a potential attacker attempting to crack the passwords;
determine a second strength of the password, the determining of the second strength based on at least an attacker's resources, a protection function used to store the password and a time available to crack the password with respect to the second adjusted minimum search space; and
provide a password policy recommendation to the entity with respect to the rule set based on a difference between the determined second strength and the determined first strength.

24. The medium of claim 22 wherein the instructions when executed further cause the at least one computing device to:
adjust the assigned amount of knowledge of the potential attacker;
determine a size of a second adjusted minimum search space based on the adjusted assigned amount of knowledge of the one or more rules possessed by the potential attacker;
determine a second strength of the password, the determining of the second strength based on at least an attacker's resources, a protection function used to store the password and a time available to crack the password with respect to the second adjusted minimum search space; and
provide a password policy recommendation to the entity based on a difference between the determined second strength and the determined first strength.

25. A system for evaluating a password, comprising:
a computing device equipped with a processor and a network interface and configured to execute an evaluation engine, the evaluation engine when executed:
receiving a rule set used to create a password for a user, the password consisting of a plurality of characters from an alphabet, the rule set required by an entity requiring the password creation and including one or more rules applicable to creating the password;

identifying a size of a minimum search space equal to the smallest subset of passwords that can be created from the alphabet based on the rule set;

calculating a complexity of the password by determining a size of an adjusted minimum search space based at least in part on an assigned amount of knowledge of the one or more rules in the rule set possessed by a potential attacker attempting to crack the password;

determining a strength of the password based on at least an attacker's resources, a protection function used to store the password and a time available to crack the password with respect to the adjusted minimum search space;

generating an evaluation of the password based on the calculated complexity and determined strength, and provide the evaluation to a designated individual; and a display device communicatively coupled to the computing device and configured to display a user interface generated by the evaluation engine.

26. The system of claim 25 wherein the computing device is further configured to execute a monitoring module that when executed:

monitors one or more social media platforms on which the user has a presence;

extracts data related to the user from the one or more social media platforms; and provides the extracted data to the evaluation engine in order to adjust the amount of assigned knowledge possessed by the potential attacker based on the extracted data.

27. The system of claim 26, wherein the evaluation engine when executed:

provides a programmatically generated alert based on the adjusting of the amount of assigned knowledge, the programmatically generated alert provided to at least one of the user and an entity associated with the password.

* * * * *